(12) United States Patent
Ohta et al.

(10) Patent No.: US 7,256,755 B2
(45) Date of Patent: Aug. 14, 2007

(54) DISPLAY APPARATUS AND DISPLAY DRIVING METHOD FOR EFFECTIVELY ELIMINATING THE OCCURRENCE OF A MOVING IMAGE FALSE CONTOUR

(75) Inventors: Shunji Ohta, Kawasaki (JP); Masanori Takeuchi, Kawasaki (JP); Yutaka Chiaki, Kawasaki (JP); Masaya Tajima, Kawasaki (JP); Akira Yamamoto, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 626 days.

(21) Appl. No.: 10/800,774

(22) Filed: Mar. 16, 2004

(65) Prior Publication Data
US 2004/0263538 A1    Dec. 30, 2004

(30) Foreign Application Priority Data
Jun. 30, 2003    (JP)    ............................. 2003-188075

(51) Int. Cl.
*G09G 3/28* (2006.01)
*G09G 5/02* (2006.01)

(52) U.S. Cl. ............................. 345/68; 345/60; 345/63; 345/204; 345/213; 345/690; 345/691; 345/692; 345/694

(58) Field of Classification Search .................. 345/60, 345/63, 68, 204, 213, 690, 691, 692, 694
See application file for complete search history.

(56) References Cited

U.S. PATENT DOCUMENTS 5,920,299 A * 7/1999 Ohshima et al. .............. 345/88
6,014,121 A * 1/2000 Aratani et al. ................ 345/89
6,144,364 A    11/2000 Otobe et al.

FOREIGN PATENT DOCUMENTS

| JP | 10-031455 | 2/1998 |
| JP | 11-085101 | 3/1999 |

* cited by examiner

*Primary Examiner*—Richard Hjerpe
*Assistant Examiner*—My-Chau T. Tran
(74) *Attorney, Agent, or Firm*—Staas & Halsey LLP

(57) ABSTRACT

A display apparatus displaying gray scale by using a subfield method has a main path, a sub path, a switch circuit, a motion region detection circuit, a first judging circuit, a level detection circuit, a motion detection correction circuit, and a second judging circuit. The switch circuit outputs a first image signal generated by the main path or a second image signal generated by the sub path by switching therebetween, and the first judging circuit outputs a first motion signal in accordance with an output of the motion region detection circuit. The motion detection correction circuit receives the first motion signal and a level signal, and outputs a second motion signal in accordance with the level signal, and the second judging circuit receives the second motion signal and the level signal, and outputs a switching control signal to the switch circuit.

14 Claims, 15 Drawing Sheets

VECTOR REPRESENTATION

LUMINANCE LEVEL

Fig.7

|   | SF6 | SF5 | SF4 | SF3 | SF2 | SF1 |    |
|---|-----|-----|-----|-----|-----|-----|----|
|   | 32  | 16  | 8   | 4   | 2   | 1   | LV |
| 0 |     |     |     |     |     |     | 0  |
| 1 |     |     |     |     |     | 1   | 0  |
| 2 |     |     |     |     | 1   |     | 1  |
| 3 |     |     |     |     | 1   | 1   | 0  |
| 4 |     |     |     | 1   |     |     | 2  |
| 5 |     |     |     | 1   |     | 1   | 1  |
| 6 |     |     |     | 1   | 1   |     | 0  |
| 7 |     |     |     | 1   | 1   | 1   | 0  |
| 8 |     |     | 1   |     |     |     | 3  |
| 9 |     |     | 1   |     |     | 1   | 2  |
| 10 |    |     | 1   |     | 1   |     | 1  |
| 11 |    |     | 1   |     | 1   | 1   | 0  |
| 12 |    |     | 1   | 1   |     |     | 0  |
| 13 |    |     | 1   | 1   |     | 1   | 0  |
| 14 |    |     | 1   | 1   | 1   |     | 0  |
| 15 |    |     | 1   | 1   | 1   | 1   | 0  |
| 16 |    | 1   |     |     |     |     | 3  |
| 17 |    | 1   |     |     |     | 1   | 2  |
| 18 |    | 1   |     |     | 1   |     | 1  |
| 19 |    | 1   |     |     | 1   | 1   | 0  |
| 20 |    | 1   |     | 1   |     |     | 0  |
| 21 |    | 1   |     | 1   |     | 1   | 0  |
| 22 |    | 1   |     | 1   | 1   |     | 0  |
| 23 |    | 1   |     | 1   | 1   | 1   | 0  |
| 24 |    | 1   | 1   |     |     |     | 2  |
| 25 |    | 1   | 1   |     |     | 1   | 1  |
| 26 |    | 1   | 1   |     | 1   |     | 0  |
| 27 |    | 1   | 1   |     | 1   | 1   | 0  |
| 28 |    | 1   | 1   | 1   |     |     | 0  |
| 29 |    | 1   | 1   | 1   |     | 1   | 0  |
| 30 |    | 1   | 1   | 1   | 1   |     | 0  |
| 31 |    | 1   | 1   | 1   | 1   | 1   | 0  |
| 32 | 1  |     |     |     |     |     | 3  |
| 33 | 1  |     |     |     |     | 1   | 2  |
| 34 | 1  |     |     |     | 1   |     | 1  |
| 35 | 1  |     |     |     | 1   | 1   | 0  |
| 36 | 1  |     |     | 1   |     |     | 0  |
| 37 | 1  |     |     | 1   |     | 1   | 0  |
| 38 | 1  |     |     | 1   | 1   |     | 0  |
| 39 | 1  |     |     | 1   | 1   | 1   | 0  |
| 40 | 1  |     | 1   |     |     |     | 2  |
| 41 | 1  |     | 1   |     |     | 1   | 1  |
| 42 | 1  |     | 1   |     | 1   |     | 0  |
| 43 | 1  |     | 1   |     | 1   | 1   | 0  |
| 44 | 1  |     | 1   | 1   |     |     | 0  |
| 45 | 1  |     | 1   | 1   |     | 1   | 0  |
| 46 | 1  |     | 1   | 1   | 1   |     | 0  |
| 47 | 1  |     | 1   | 1   | 1   | 1   | 0  |
| 48 | 1  | 1   |     |     |     |     | 3  |
| 49 | 1  | 1   |     |     |     | 1   | 2  |
| 50 | 1  | 1   |     |     | 1   |     | 1  |
| 51 | 1  | 1   |     |     | 1   | 1   | 0  |
| 52 | 1  | 1   |     | 1   |     |     | 0  |
| 53 | 1  | 1   |     | 1   |     | 1   | 0  |
| 54 | 1  | 1   |     | 1   | 1   |     | 0  |
| 55 | 1  | 1   |     | 1   | 1   | 1   | 0  |
| 56 | 1  | 1   | 1   |     |     |     | 2  |
| 57 | 1  | 1   | 1   |     |     | 1   | 1  |
| 58 | 1  | 1   | 1   |     | 1   |     | 0  |
| 59 | 1  | 1   | 1   |     | 1   | 1   | 0  |
| 60 | 1  | 1   | 1   | 1   |     |     | 0  |
| 61 | 1  | 1   | 1   | 1   |     | 1   | 0  |
| 62 | 1  | 1   | 1   | 1   | 1   |     | 0  |
| 63 | 1  | 1   | 1   | 1   | 1   | 1   | 0  |

$LV = 0 \Rightarrow MV' = 0$ $LV \neq 0 \Rightarrow MV' = MV$

Fig.12

| GS | LV | GP |
|----|----|----|
| 1  | 0  | 0  |
| 2  | 0  | 0  |
| 3  | 1  | 0  |
| 4  | 0  | 1  |
| 5  | 0  | 1  |
| 6  | 3  | 1  |
| 7  | 0  | 2  |
| 8  | 0  | 2  |
| 9  | 0  | 2  |
| 10 | 1  | 2  |
| ⋮  | ⋮  | ⋮  |

$LV = 0 \Rightarrow MV' = 0$ $LV \neq 0 \Rightarrow MV'' = MV'$

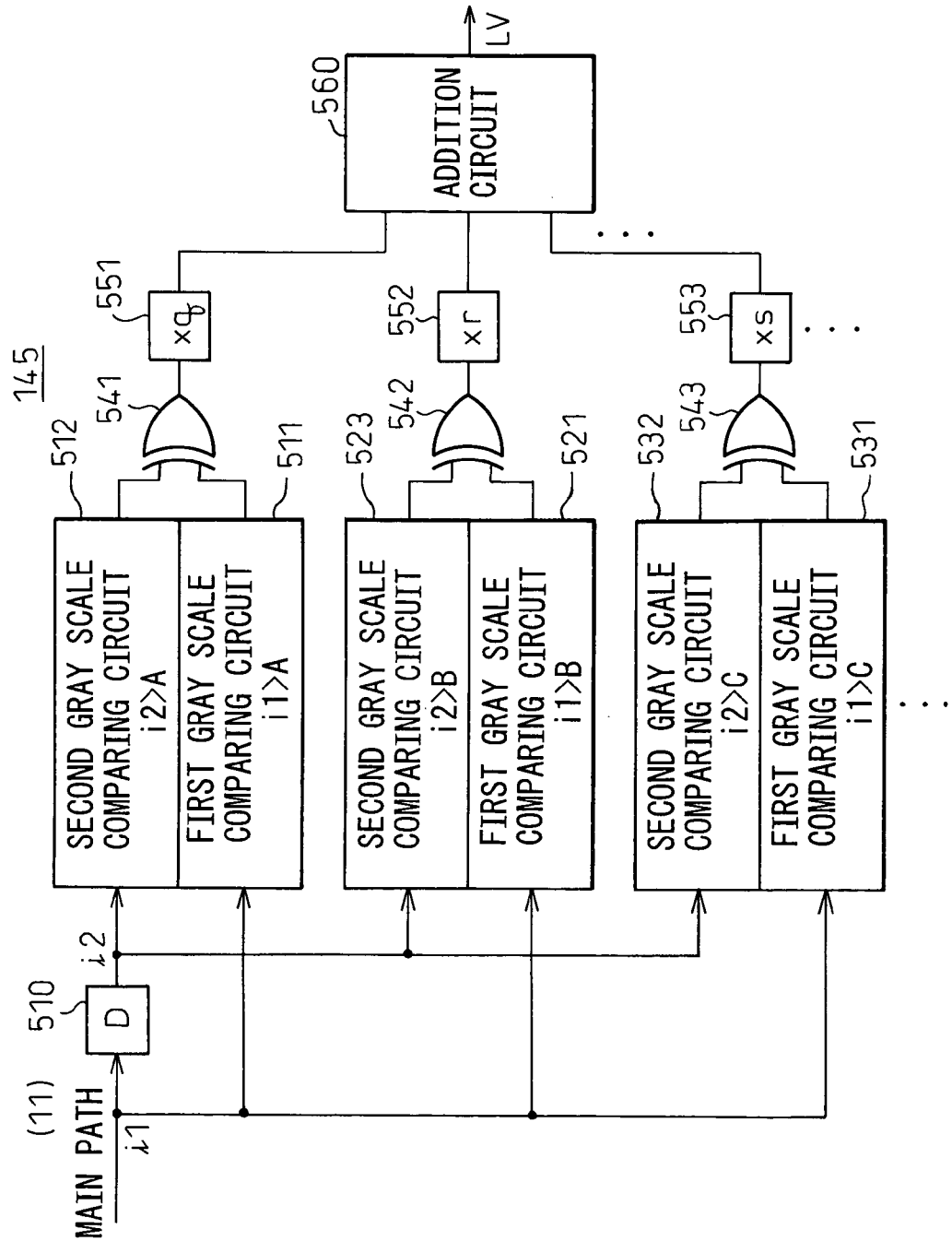

DISPLAY APPARATUS AND DISPLAY DRIVING METHOD FOR EFFECTIVELY ELIMINATING THE OCCURRENCE OF A MOVING IMAGE FALSE CONTOUR

CROSS REFERENCE TO RELATED APPLICATION

This application is based upon and claims the benefit of priority from the prior Japanese Patent Application No. 2003-188075, filed on Jun. 30, 2003, the entire contents of which are incorporated herein by reference.

BACKGROUND OF THE INVENTION

1. Field of the Invention

The present invention relates to a display apparatus and a display driving method and, more particularly, to a display apparatus and a display driving method suitable for driving a plasma display panel (PDP).

2. Description of the Related Art

With the recent trend toward larger-screen displays, the need for thin display apparatuses has been increasing, and various types of thin display apparatus have been commercially implemented. Examples include matrix panels that display images by directly using digital signals, such as PDPs and other gas discharge display panels, digital micromirror devices (DMDs), EL display devices, fluorescent display tubes, and liquid crystal display devices. Among such thin display devices, gas discharge display panels are considered to be the most promising candidate for large-area, direct-view HDTV (high-definition television) display devices, because of the simple production process which facilitates fabrication of larger-area displays, a self-luminescent property which ensures good display quality, and a high response speed.

A plasma display apparatus that utilizes a surface discharge has a structure such that a pair of electrodes are formed on the inner surface of a front glass substrate and a rare gas is filled therein. When a voltage is applied between the electrodes, a surface discharge occurs at the surface of a protective layer and a dielectric layer formed on the electrode surface, resulting in the emission of ultraviolet light. The inner surface of a rear glass substrate is coated with phosphors of three primary colors, red (R), green (G), and blue (B), which when excited by the ultraviolet light, produce visible light to achieve a color display.

In the plasma display apparatus, each field (frame) is divided into a plurality of weighted subfields (SFs: light emission blocks) each comprising a plurality of sustain discharge pulses (sustain pulses), and a gray scale display is achieved by combining these subfields. In a display apparatus that achieves a gray scale display by combining a plurality of such weighted subfields, a phenomenon can occur in which an unnatural color contour, which normally should not exist, appears on the surface of a moving image due to the persistence of human vision, etc. This phenomenon is generally known as a "moving image false contour" or a "moving image pseudo contour". In particular, when a person in a displayed image moves, a green or red color band occurs, for example, on the contour of the person's face or other flesh-colored portions, and this greatly degrades the picture quality.

In the prior art, techniques for improving the picture quality by reducing the moving image false contour phenomenon have been proposed in Japanese Patent No. 3322809 (Japanese Unexamined Patent Publication (Kokai) No. 10-31455: JPP'455) and Japanese Unexamined Patent Publication (Kokai) No. 11-85101 (JPP'101).

The prior art and its associated problems will be described in detail later with reference to accompanying drawings.

SUMMARY OF THE INVENTION

According to the present invention, there is provided a display apparatus which expresses luminance by varying light emission time length and displays a gray scale by using a subfield method, comprising a main path generating a first image signal having a smaller number of gray scale levels than an input image signal; a sub path generating a second image signal having a smaller number of gray scale levels than the first image signal; a switch circuit outputting the first image signal generated by the main path or the second image signal generated by the sub path by switching therebetween; a motion region detection circuit detecting a motion region from the input image signal or a signal obtained by processing the input image signal; a first judging circuit outputting a first motion signal in accordance with an output of the motion region detection circuit; a level detection circuit outputting a level signal by detecting a pixel of a particular gray scale level from the main path; a motion detection correction circuit receiving the first motion signal and the level signal, and outputting a second motion signal in accordance with the level signal; and a second judging circuit receiving the second motion signal and the level signal, and outputting a switching control signal to the switch circuit.

The level signal from the level detection circuit may indicate a gray scale level where a moving image false contour occurs, the motion detection correction circuit may output the first motion signal from the first judging circuit through to the second judging circuit. The image signal may be any one of RGB signals of red, green, and blue; and the main path, the sub path, the switch circuit, the motion region detection circuit, the first judging circuit, the level detection circuit, the motion detection correction circuit, and the second judging circuit may be provided for each of the RGB signals.

Further, according to the present invention, there is provided a display apparatus which expresses luminance by varying light emission time length and displays a gray scale by using a subfield method, comprising a main path generating a first image signal having a smaller number of gray scale levels than an input image signal; a sub path generating a second image signal having a smaller number of gray scale levels than the first image signal; a switch circuit outputting the first image signal generated by the main path or the second image signal generated by the sub path by switching therebetween; a motion region detection circuit detecting a motion region from the input image signal or a signal obtained by processing the input image signal; a first judging circuit outputting a first motion signal in accordance with an output of the motion region detection circuit; a level detection circuit outputting a level signal by detecting a pixel of a particular gray scale level from the main path; a second judging circuit receiving the first motion signal and the level signal, and outputting a second motion signal in accordance with the level signal; and a level priority circuit receiving the second motion signal and the level signal, and outputting a switching control signal to the switch circuit.

When the level signal from the level detection circuit indicates a gray scale level where a moving image false contour occurs, the level priority circuit may output the second motion signal from the second judging circuit through to the switch circuit. The level detection circuit may output a signal of level 0 for a gray scale level where a moving image false contour does not occur, and a signal of other level for a gray scale level where a moving image false contour occurs. For a gray scale level where a moving image false contour occurs, the level detection circuit may output a signal of one of levels 1 to 3 depending on the magnitude of the moving image false contour that occurs.

The display apparatus may further comprise an edge detection circuit detecting an edge from the input image signal or a signal obtained by processing the input image signal, wherein the first judging circuit receives an output signal of the edge detection circuit as well as an output signal of the motion region detection circuit, and outputting the motion signal. The image signal may be any one of RGB signals of red, green, and blue; and the main path, the sub path, the switch circuit, the motion region detection circuit, the first judging circuit, the level detection circuit, the second judging circuit, and the level priority circuit may be provided for each of the RGB signals.

According to the present invention, there is also provided a display apparatus which expresses luminance by varying light emission time length and displays a gray scale by using a subfield method, comprising a main path generating a first image signal having a smaller number of gray scale levels than an input image signal; a sub path generating a second image signal having a smaller number of gray scale levels than the first image signal; a switch circuit outputting the first image signal generated by the main path or the second image signal generated by the sub path by switching therebetween; a motion region detection circuit detecting a motion region from the input image signal or a signal obtained by processing the input image signal; a first judging circuit outputting a first motion signal in accordance with an output of the motion region detection circuit; a level detection circuit outputting a level signal by detecting a pixel of a particular gray scale level from the main path and by performing a prescribed computation; and a second judging circuit receiving the first motion signal and the level signal, and outputting a switching control signal to the switch circuit.

The level detection circuit may output the level signal by computing whether the first image signal from the main path contains a signal that straddles any one of a plurality of particular gray scale levels where a moving image false contour occurs. The level detection circuit may include a delay circuit delaying by one pixel the first image signal supplied from the main path; a first gray scale comparing circuit comparing the first image signal with a particular gray scale level where a moving image false contour occurs; a second gray scale comparing circuit comparing an output signal of the delay circuit with the particular gray scale level where a moving image false contour occurs; an EOR circuit exclusive-ORing an output of the first gray scale comparing circuit with an output of the second gray scale comparing circuit; and a multiplication circuit multiplying an output of the EOR circuit with a prescribed coefficient.

The first gray scale comparing circuit, the second gray scale comparing circuit, the EOR circuit, and the multiplication circuit may be provided for each of the plurality of particular gray scale levels where a moving image false contour occurs. The display apparatus may further comprise an addition circuit adding together output signals of the plurality of multiplication circuits corresponding to the plurality of particular gray scale levels where a moving image false contour occurs, and outputting the result of the addition as the level signal.

For a gray scale level where a moving image false contour does not occur, the level detection circuit may output a signal of level 0, while for a gray scale level where a moving image false contour occurs, the level detection circuit may output a signal of a level equal to the coefficient multiplied in one of the plurality of multiplication circuits that corresponds to the gray scale level where a moving image false contour occurs. The coefficients multiplied in the plurality of multiplication circuits that correspond to the gray scale levels where a moving image false contour occurs may be each set as any one of 1 to 3 depending on the magnitude of the moving image false contour that occurs.

The display apparatus may further comprise an edge detection circuit detecting an edge from the input image signal or a signal obtained by processing the input image signal, wherein the first judging circuit receives an output signal of the edge detection circuit as well as an output signal of the motion region detection circuit, and outputs the motion signal. The image signal may be any one of RGB signals of red, green, and blue; and the main path, the sub path, the switch circuit, the motion region detection circuit, the first judging circuit, the level detection circuit, and the second judging circuit may be provided for each of the RGB signals. The display apparatus may be a plasma display apparatus.

According to the present invention, there is provided a display driving method for driving a display that expresses luminance by varying light emission time length and displays a gray scale by using a subfield method, the display comprising a main path generating a first image signal having a smaller number of gray scale levels than an input image signal; a sub path generating a second image signal having a smaller number of gray scale levels than the first image signal; a switch circuit outputting the first image signal generated by the main path or the second image signal generated by the sub path by switching therebetween; and an image feature judging section controlling the switch circuit by detecting an image feature from the input image signal or a signal obtained by processing the input image signal, and by also detecting a pixel of a particular gray scale level from the main path, wherein the image feature judging section detects a motion region from the input image signal or the processed signal; generates a first motion signal based on the detected motion region; generates a level signal by detecting the pixel of the particular gray scale level from the main path; generates a second motion signal by correcting the first motion signal in accordance with the level signal; and generates, in accordance with the second motion signal and the level signal, a switching control signal for controlling the switch circuit.

When the level signal indicates a gray scale level where a moving image false contour occurs, the second motion signal may be substantially the same signal as the first motion signal.

Further, according to the present invention, there is provided a display driving method for driving a display that expresses luminance by varying light emission time length and displays a gray scale by using a subfield method, the display comprising a main path generating a first image signal having a smaller number of gray scale levels than an input image signal; a sub path generating a second image signal having a smaller number of gray scale levels than the first image signal; a switch circuit outputting the first image signal generated by the main path or the second image signal generated by the sub path by switching therebetween; and an image feature judging section controlling the switch circuit by detecting an image feature from the input image signal or a signal obtained by processing the input image signal, and by also detecting a pixel of a particular gray scale level from the main path, wherein the image feature judging section detects a motion region from the input image signal or the processed signal; generates a first motion signal based on the detected motion region; generates a level signal by detecting the pixel of the particular gray scale level from the main path; generates a second motion signal from the first motion signal in accordance with the level signal; and generates, in accordance with the second motion signal and the level signal, a switching control signal for controlling the switch circuit.

When the level signal indicates a gray scale level where a moving image false contour occurs, the switching control signal may be substantially the same signal as the second motion signal. The level signal may be a signal of level 0 for a gray scale level where a moving image false contour does not occur, and may be a signal of other level for a gray scale level where a moving image false contour occurs. For a gray scale level where a moving image false contour occurs, the level signal may be a signal of one of levels 1 to 3 depending on the magnitude of the moving image false contour that occurs.

The first motion signal may be generated based on the motion region detected from the input image signal or the processed signal and on an edge detected from the input image signal or a signal obtained by processing the input image signal. The image signal may be any one of RGB signals of red, green, and blue; and the main path, the sub path, the switch circuit, and the image feature judging section may be provided for each of the RGB signals.

According to the present invention, there is also provided a display driving method for driving a display that expresses luminance by varying light emission time length and displays a gray scale by using a subfield method, the display comprising a main path generating a first image signal having a smaller number of gray scale levels than an input image signal; a sub path generating a second image signal having a smaller number of gray scale levels than the first image signal; a switch circuit outputting the first image signal generated by the main path or the second image signal generated by the sub path by switching therebetween; and an image feature judging section controlling the switch circuit by detecting an image feature from the input image signal or a signal obtained by processing the input image signal, and by also detecting a pixel of a particular gray scale level from the main path, wherein the image feature judging section detects a motion region from the input image signal or the processed signal; generates a first motion signal based on the detected motion region; generates a level signal by detecting the pixel of the particular gray scale level from the main path and by performing a prescribed computation; and generates, in accordance with the first motion signal and the level signal, a switching control signal for controlling the switch circuit.

The level signal may be generated by computing whether the first image signal from the main path contains a signal that straddles any one of a plurality of particular gray scale levels where a moving image false contour occurs. The level signal may be generated by delaying by one pixel the first image signal supplied from the main path; generating a first gray scale comparison signal by comparing the first image signal with a particular gray scale level where a moving image false contour occurs; generating a second gray scale comparison signal by comparing an output signal of the delay circuit with the particular gray scale level where a moving image false contour occurs; and exclusive-ORing the first gray scale comparison signal with the second gray scale comparison signal, and multiplying the result of the exclusive ORing with a prescribed coefficient.

The comparison with the particular gray scale level may be performed with respect to each of the plurality of particular gray scale levels where a moving image false contour occurs. Results of computations for the plurality of particular gray scale levels where a moving image false contour occurs may be added together and output as the level signal. The level circuit may perform computations so that, for a gray scale level where a moving image false contour does not occur, a signal of level 0 is output, while for a gray scale level where a moving image false contour occurs, a signal of a level equal to the coefficient corresponding to the gray scale level where a moving image false contour occurs is output. The coefficient multiplied corresponding to the gray scale level where a moving image false contour occurs may be set as any one of 1 to 3 depending on the magnitude of the moving image false contour that occurs.

The first motion signal may be generated based on the motion region detected from the input image signal or the processed signal and on an edge detected from the input image signal or a signal obtained by processing the input image signal. The image signal may be any one of RGB signals of red, green, and blue; and the main path, the sub path, the switch circuit, and the image feature judging section may be provided for each of the RGB signals. The display panel may be a plasma display panel.

BRIEF DESCRIPTION OF THE DRAWINGS

The present invention will be more clearly understood from the description of the preferred embodiments as set forth below with reference to the accompanying drawings, wherein:

FIG. 7 is a diagram for explaining one example of a level detection circuit in the image processing circuit of FIG. 3;

FIG. 12 is a diagram for explaining the operation of the motion detection correction circuit of FIG. 11;

FIG. 15 is a block diagram schematically showing a level detection circuit in still another embodiment of an image processing circuit in the plasma display apparatus according to the present invention.

DESCRIPTION OF THE PREFERRED EMBODIMENTS

Before proceeding to the detailed description of the preferred embodiments of the present invention, the prior art display apparatuses and display driving methods and their associated problems will be described with reference to the drawings.

Figure 1:
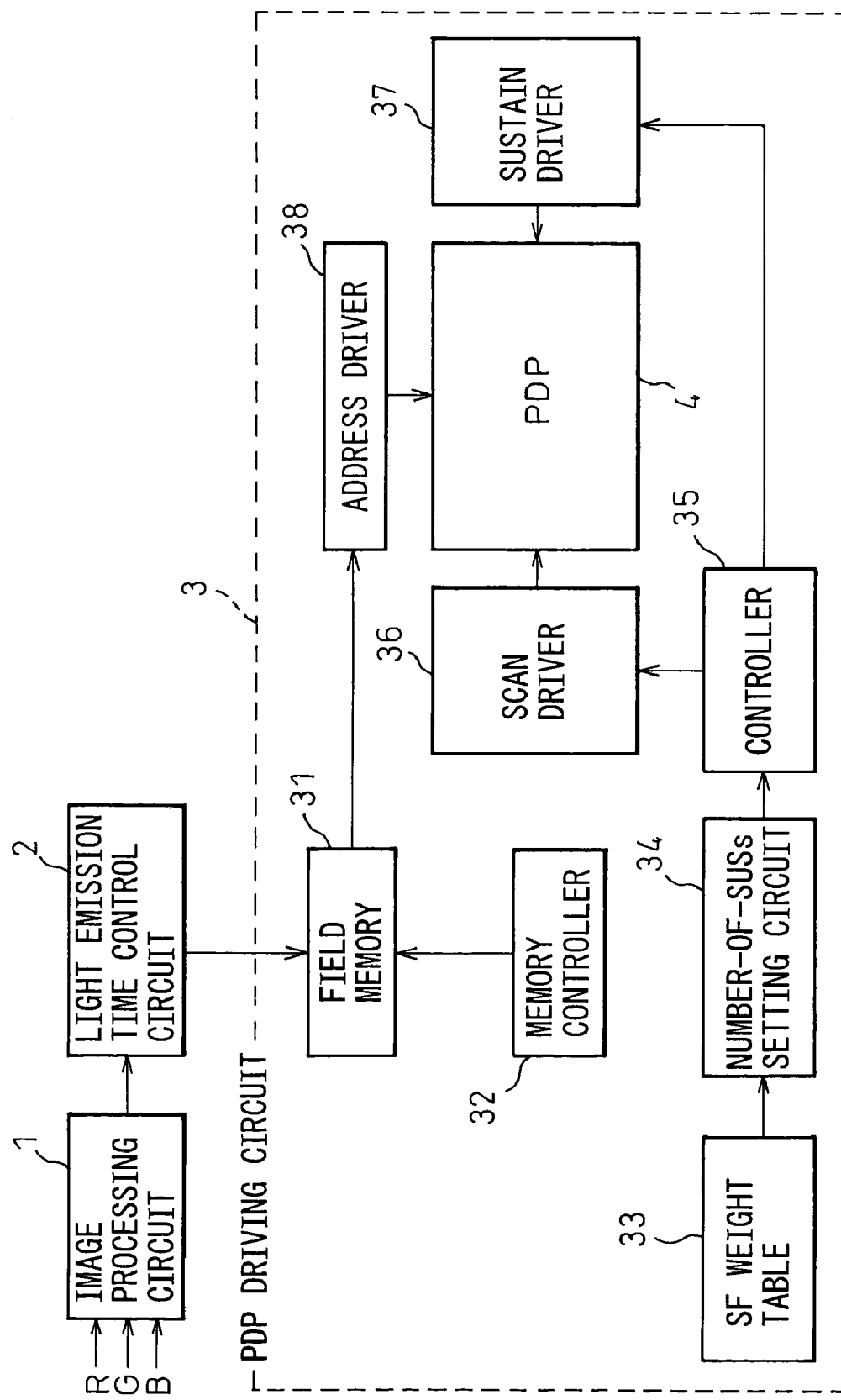
FIG. 1 is a block diagram schematically showing one example of a plasma display apparatus.

FIG. 1 is a block diagram schematically showing one example of a plasma display apparatus. In FIG. 1, reference numeral 1 is an image processing circuit, 2 is an light emission time control circuit, 3 is a PDP driving circuit, and 4 is a PDP. For convenience of illustration, in FIG. 1 the PDP 4 is shown inside the PDP driving circuit 3.

As shown in FIG. 1, the plasma display apparatus comprises: the image processing circuit 1 which processes image signals of R, G, and B colors; the light emission time control circuit 2 which controls the light emission time for light emission in the PDP 4 in accordance with output signals of the image processing circuit 1; and the PDP driving circuit 3 which drives the PDP 4 in accordance with the output of the light emission time control circuit 2. The PDP driving circuit 3 comprises a field memory 31, a memory controller 32, an SF weight table 33, a number-of-SUSs setting circuit 34, a controller 35, a scan driver 36, a sustain driver 37, and an address driver 38. Here, the SF weight table 33 is a memory device which stores the ratio of the number of SUSs (weight) for each subfield, and the number-of-SUSs setting circuit 34 is a circuit which, in accordance with the SF weight table 33, sets the number of SUSs with which each SF is caused to emit light.

The light emission time control circuit 2 receives the output signals of the image processing circuit 1, converts them into data indicating the times and the subfields for light emission to achieve desired gray scale levels, and supplies the converted data to the PDP driving circuit 3. The converted data supplied from the light emission time control circuit 2 is written to and read from the field memory 31 under the control of the memory controller 32. Here, the light emission time control circuit 2 and the field memory 31 together constitute a subfield converting section.

The address driver 38 drives the PDP 4 based on the data read from the field memory 31. The controller 35 receives the output of the SF weight table 33 via the number-of-SUSs setting circuit 34, and controls the driving of the PDP 4 by controlling the scan driver 36 as well as the sustain driver 37. When the PDP 4 is driven by the scan driver 36 and the address driver 38, a wall charge is formed on each pixel to be activated for light emission in each subfield, and when the PDP 4 is driven by the sustain driver 37, a sustain discharge occurs.

Figure 2:
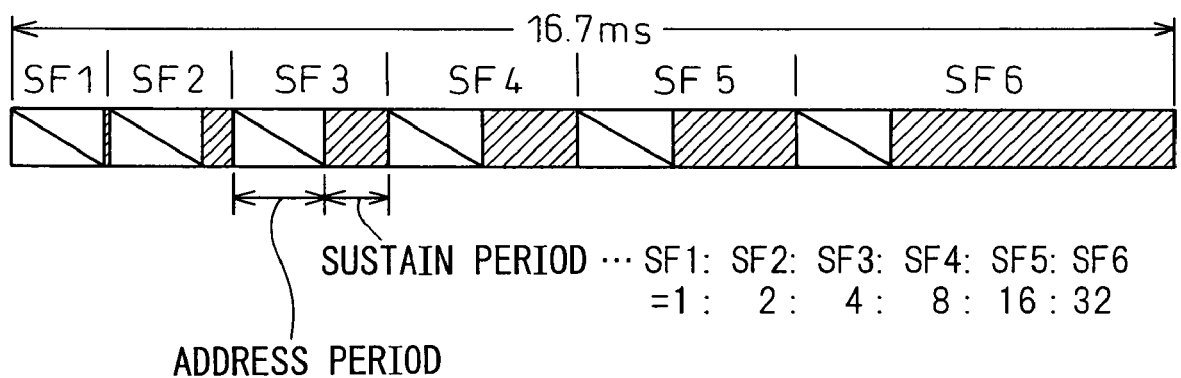
FIG. 2 is a diagram showing one example of a gray scale driving sequence in a prior art plasma display apparatus.

FIG. 2 is a diagram showing one example of a gray scale driving sequence in the prior art plasma display apparatus. As shown in FIG. 2, in the gray scale driving sequence for the plasma display apparatus, each field for forming one complete image is divided, for example, into a plurality of subfields (for example, SF1 to SF6), and a gray scale display of the image is achieved by controlling the sustain period (light emission period) in each subfield. Each subfield comprises an address period in which a wall charge is formed for all the pixels that are to be activated for light emission in the subfield period, and the sustain period which determines the luminance level. Accordingly, if the number of subfields is increased, the number of address periods increases correspondingly, and the sustain periods for light emission are relatively shortened, resulting in reduced screen brightness.

In a PDP, in order to increase the number of reproducible gray scale levels by using the limited number of subfields, a gray scale driving method is commonly employed that drives the PDP by using the sustain periods proportional to the bit weights as shown in FIG. 2. That is, in the example shown in FIG. 2, one field is made up of six subfield periods SF1 to SF6, and 64 levels of gray scale are reproduced by a 6-bit image signal (image data) corresponding to each subfield. The sustain periods in the respective subfield periods SF1 to SF6 are indicated by hatching by assuming, for convenience, that light emission is produced in each subfield period, and the time (length) ratio is set as SF1:SF2:SF3:SF4:SF5:SF6=1:2:4:8:16:32. Here, one field period is about 16.7 ms.

When displaying a moving image on the PDP using the above gray scale driving sequence, a phenomenon can occur in which an unnatural color contour, which normally should not exist, appears on the surface of the moving image due to the persistence of human vision, etc. The contour occurring in this phenomenon is generally known as a "moving image false contour". This moving image false contour becomes particularly noticeable when a person on the display screen moves; for example, a green or red color band occurs on the contour of the person's face or other flesh-colored portions, degrading the picture quality.

In the prior art, techniques for improving the picture quality by reducing the moving image false contour phenomenon have been proposed in JPP'455 and JPP'101.

Figure 3:
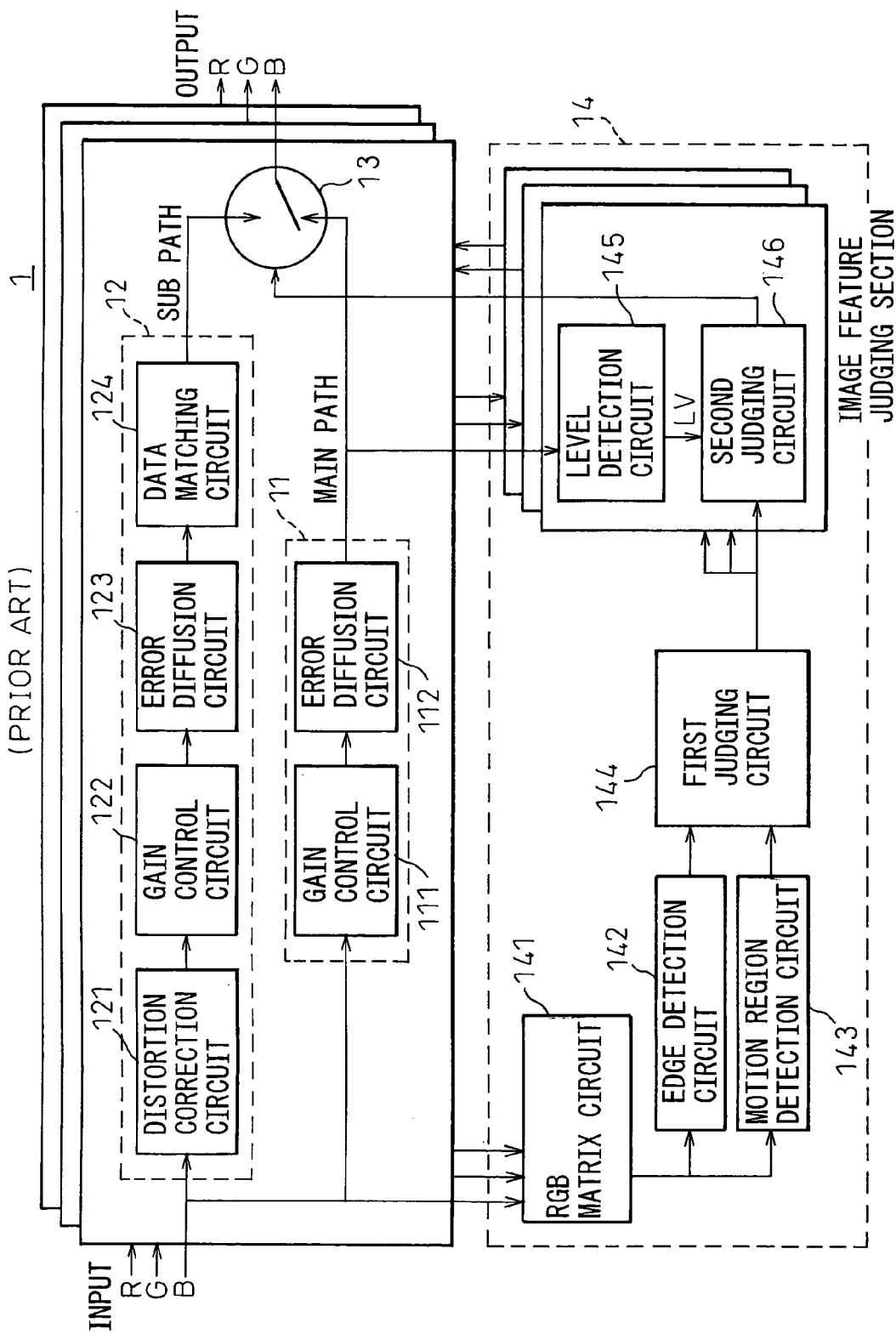
FIG. 3 is a block diagram showing one example of an image processing circuit in the prior art plasma display apparatus.

FIG. 3 is a block diagram showing one example of an image processing circuit in the prior art plasma display apparatus, which is applied, for example, as the image processing circuit 1 in the plasma display apparatus shown in FIG. 1.

As shown in FIG. 3, the image processing circuit 1 roughly comprises a main path 11, a sub path 12, a switch circuit 13, and an image feature judging section 14. Each input image signal is supplied in parallel to the main path 11, the sub path 12, and to a part of the image feature judging section 14. The output of the main path 11 is supplied to the switch circuit 13, as well as to a part of the image feature judging section 14. The output of the sub path 12 is supplied to the switch circuit 13. Based on a path select/switch signal supplied from the image feature judging section 14, the switch circuit 13 supplies the image signal from the main path 11 or the sub path 12, whichever is selected, to the light emission time control circuit 2 shown in FIG. 1.

The main path 11 includes a gain control circuit 111 which is supplied with the input image signal, and an error diffusion circuit 112 which is supplied with an output signal of the gain control circuit 111. On the other hand, the sub path 12 includes a distortion correction circuit 121 which is supplied with the input image signal, a gain control circuit 122 which is supplied with an output signal of the distortion correction circuit 121, an error diffusion circuit 123 which is supplied with an output signal of the gain control circuit 122, and a data matching circuit 124 which is supplied with an output signal of the error diffusion circuit 123.

The image feature judging section 14 includes an RGB matrix circuit 141 which is supplied with the input image signals, an edge detection circuit 142 and a motion region detection circuit 143 each of which is supplied with an output signal of the RGB matrix circuit 141, a first judging circuit 144 which is supplied with output signals of the edge detection circuit 142 and the motion region detection circuit 143, a level detection circuit 145 which is supplied with the output signal of the main path, and a second judging circuit 146 which is supplied with output signals of the first judging circuit 144 and the level detection circuit 145. Here, when each field comprises eight subfields, and the ratio of the number of sustain pulses among the respective subfield periods is set as SF1:SF2:SF3:SF4:SF5:SF6:SF7:SF8=12:8:4:2:1:4:8:12, for example, the main path 11 represents 52 real gray scale levels with a 6-bit output for each of the RGB signals; in this case, the number of reproducible gray scale levels for each color is 52 from level 0 to level 51.

In the image processing circuit shown in FIG. 3, rather than performing image motion detection and edge detection for each of the three RGB colors independently of each other, the RGB matrix circuit 141 generates a luminance signal from the RGB signals and, based on the generated luminance signal, the edge detection circuit 142 detects an edge of the image and the motion region detection circuit 143 detects a motion region in the image, thereby achieving a reduction in the amount of circuitry. The luminance signal Y can be generated using a generating equation such as Y=0.30 R+0.59 G+0.11 B.

The highest luminance level that can be displayed on the PDP 4 via the main path 11 is 51 with a 6-bit output, while the highest luminance level of the input image signal is 255 with an 8-bit input. Accordingly, the gain control circuit 111 multiplies the input image signal with a gain coefficient $51 \times 2^{8-6}/255 = 204/255$. As a result of the multiplication with this gain coefficient, the error diffusion circuit 112 at the next stage can apply error diffusion over the entire range of the input image signal. The gain control circuit 111 can be constructed from a conventional multiplier or from a memory such as a RAM (Random Access Memory) or a ROM (Read Only Memory).

By applying error diffusion to the image signal obtained via the gain control circuit 111, the error diffusion circuit 112 simulates intermediate gray levels to increase the number of gray scale levels. As the number of reproducible gray scale levels in the main path 11 is 52, the output bit count of the error diffusion circuit 112 is 6.

The sub path 12 represents 9 real gray scale levels with a 4-bit output; in this case, the number of reproducible gray scale levels for each of the RGB colors is 9 from level 0 to level 8.

The sub path 12 can represent gray scale in 9 steps from 0 to 8, but the amount of luminance does not increase equally, but increases unequally such as 0, 1, 3, 7, 11, and so on. As a result, a correction that is an inverse function of the display characteristic after the error diffusion must be applied to obtain a linear display characteristic as a whole. In the distortion correction circuit 121, such an inverse function characteristic is stored in a ROM or RAM table.

Figure 4:
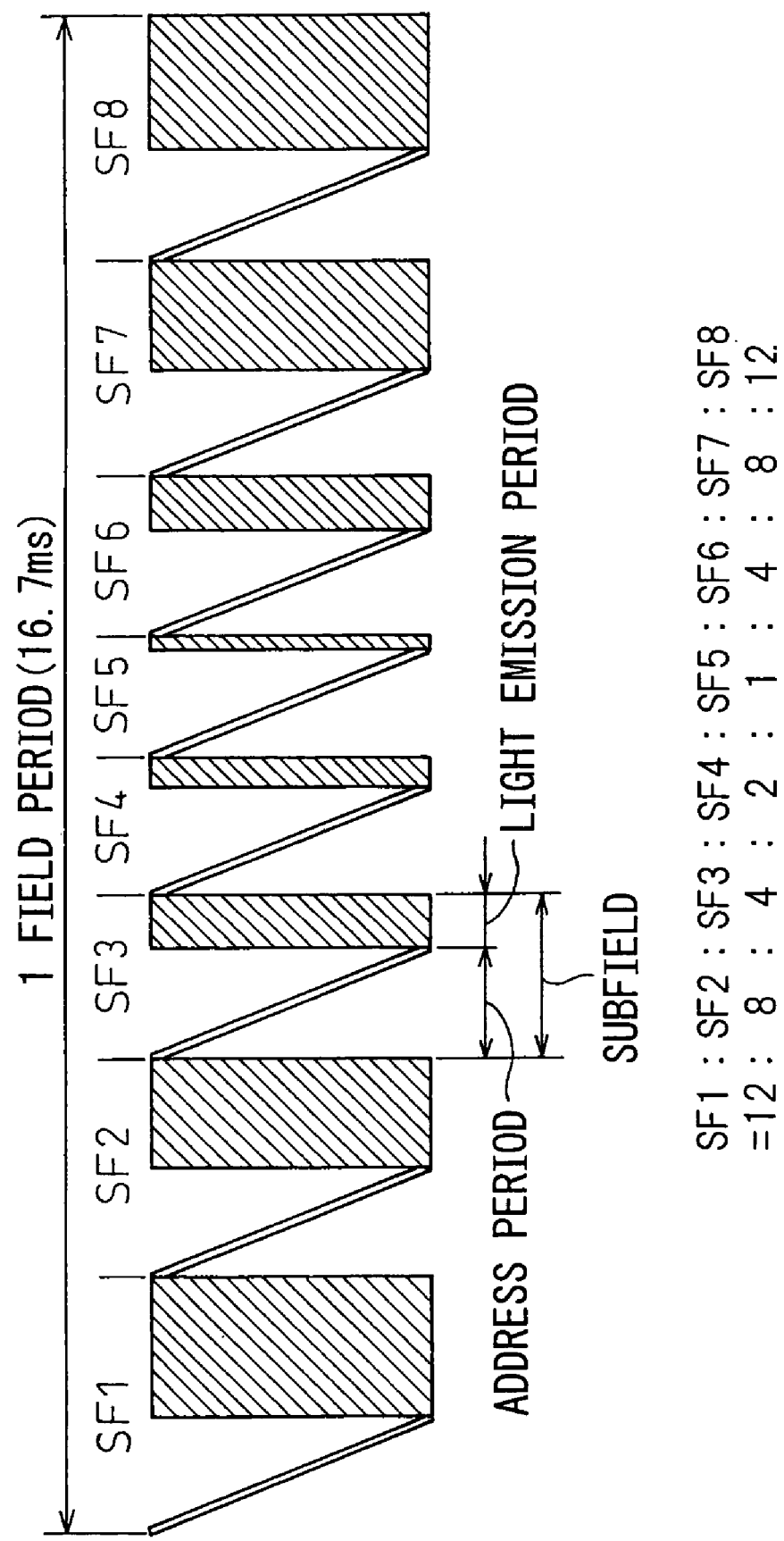
FIG. 4 is a diagram showing another example of the gray scale driving sequence in the plasma display apparatus.
Figure 5:
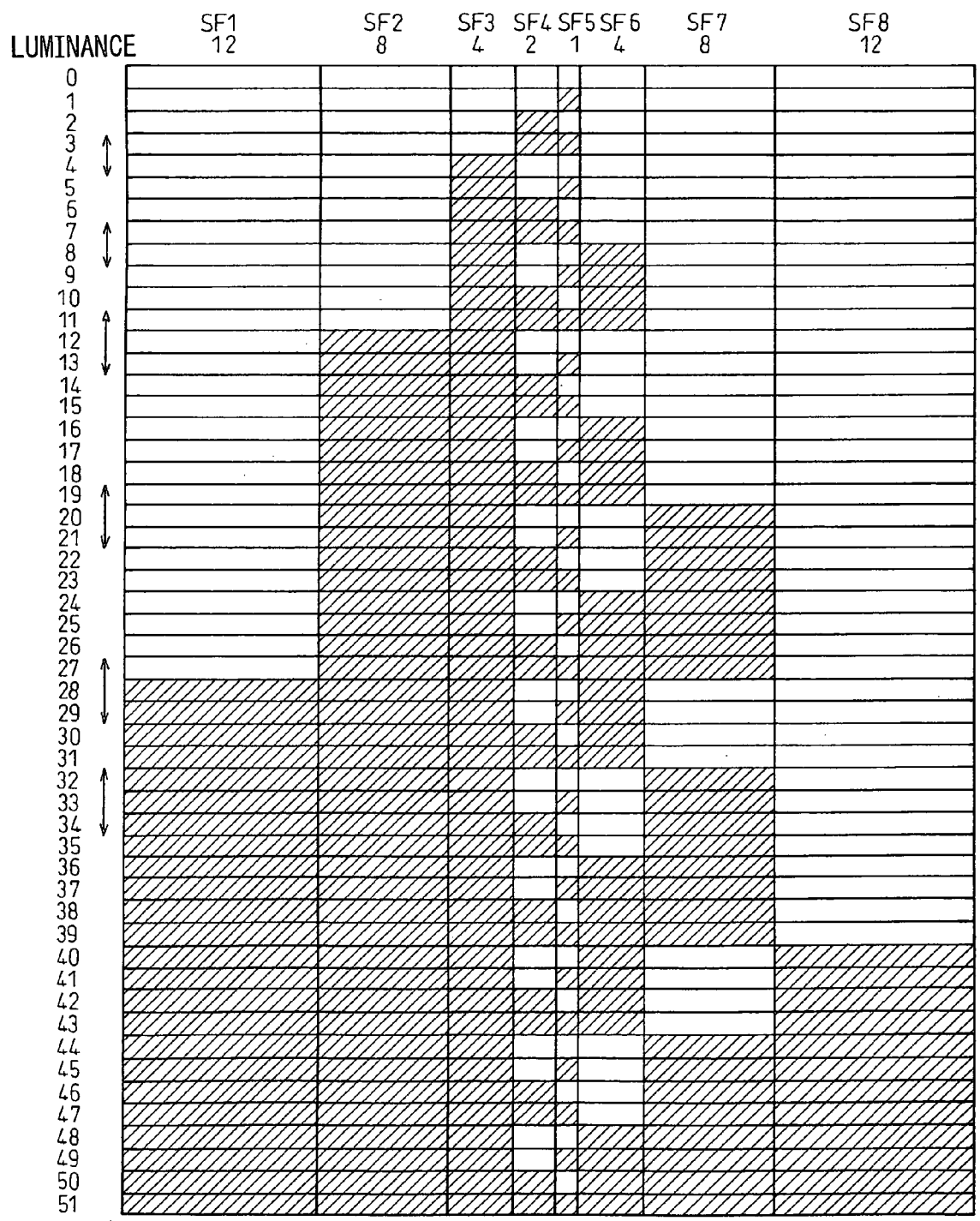
FIG. 5 is a diagram showing one example of an arrangement of light emission subfield periods for each luminance level in a main path.
Figure 6:
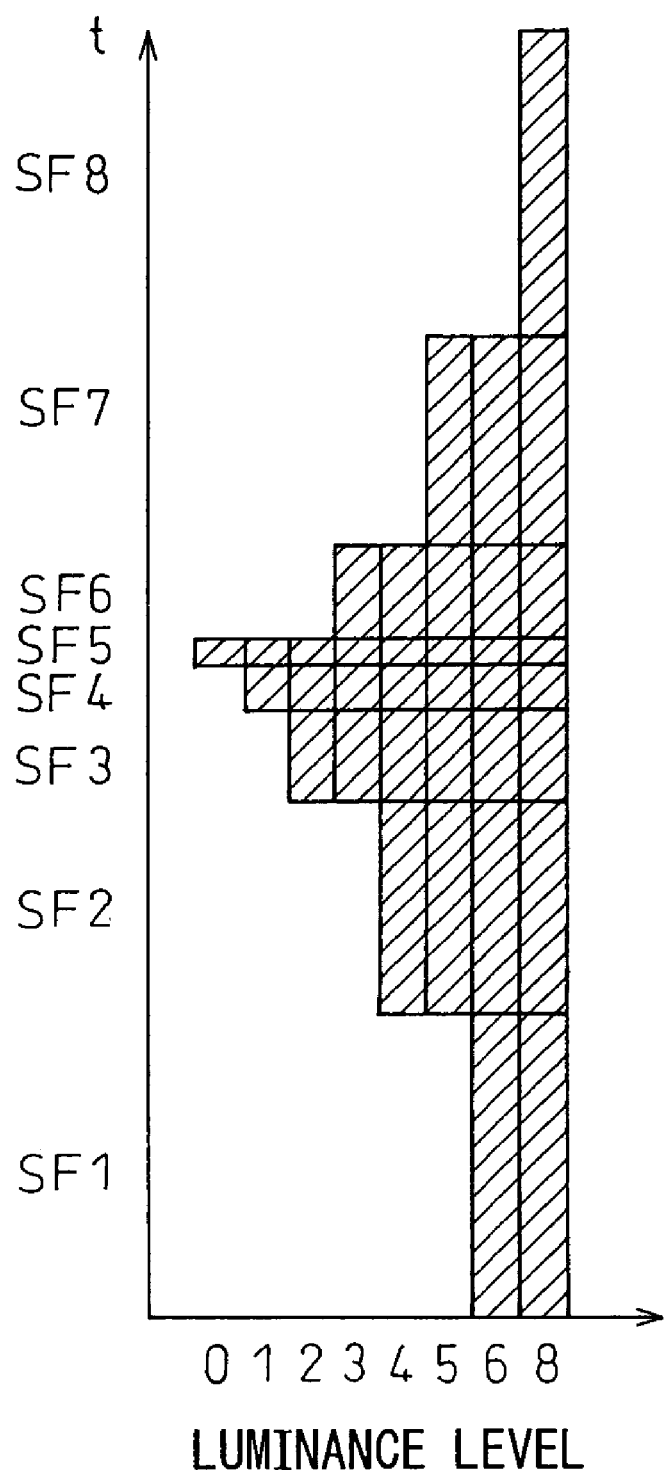
FIG. 6 is a diagram showing one example of an arrangement of light emission subfield periods for each luminance level in a sub path.

FIG. 4 is a diagram showing another example of the gray scale driving sequence in the plasma display apparatus, FIG. 5 is a diagram showing one example of an arrangement of light emission subfield periods for each luminance level in the main path, and FIG. 6 is a diagram showing one example of an arrangement of light emission subfield periods for each luminance level in the sub path.

When each field is made up of eight subfields SF1 to SF8, and the ratio of the number of sustain pulses (the luminance level ratio) is set as SF1:SF2:SF3:SF4:SF5:SF6:SF7:SF8=12:8:4:2:1:4:8:12, as described above, the gray scale driving sequence is as shown in FIG. 4.

In this case, the main path 11 can reproduce the input image signal in 52 real gray scale levels, and the arrangement of the light emission subfield periods for each luminance level is as shown by hatching in FIG. 5. On the other hand, the sub path 12 reproduces the input image signal in 9 real gray scale levels, and the arrangement of the light emission subfield periods for each luminance level is as shown in FIG. 6. The display characteristic of the input image signal, after processing through the sub path 12, is nonlinear; therefore, the inverse function correction for correcting the nonlinear characteristic and the error diffusion are applied to correct the nonlinear display characteristic to the linear display characteristic.

The highest luminance level that can be displayed on the PDP 4 via the sub path 12 is 8 with a 4-bit output, while the highest luminance level of the input image signal is 255 with an 8-bit input. Accordingly, the gain control circuit 122 multiplies the input image signal with a gain coefficient $8 \times 2^{8-4}/255 = 128/255$. As a result of the multiplication with this gain coefficient, the error diffusion circuit 123 at the next stage can apply error diffusion over the entire range of the input image signal. The gain control circuit 122 can be constructed from a conventional multiplier or from a RAM or a ROM.

By applying error diffusion to the image signal obtained via the gain control circuit 122, the error diffusion circuit 123 simulates intermediate gray levels to increase the number of gray scale levels. As the number of reproducible gray scale levels in the sub path 12 is 9, the output bit count of the error diffusion circuit 123 is 4. The data matching circuit 124 is provided to match the luminance level in the sub path 12 to the luminance level in the main path 11.

Based on the path select/switch signal supplied from the image feature judging section 14, the switch circuit 13 switches the path to be used in accordance with the input image signal. Accordingly, for the RGB signals constituting the input image signals, the path switching is performed for each of the R, G, and B colors independently of each other. Therefore, even in the case of the RGB signals for the same pixel, there can occur cases where, for example, the R signal is processed through the main path 11 while the G and B signals are processed through the sub path 12.

Next, the operation of the image feature judging circuit 14 will be described. The image feature judging circuit 14 detects an image on which a moving image false contour is likely to occur, and generates and outputs the path select/switch signal for instructing the switch circuit 13 to switch the path so that pixel data forming such an image will be processed through the sub path 12.

As earlier described, the moving image false contour tends to occur at specific luminance levels, that is, at such luminance levels where the light emission subfield period greatly varies along the time axis even though the gray scale level changes only slightly. In view of this, the level detection circuit 145 includes a memory such as a RAM or a ROM and, based on the output of the error diffusion circuit 112 in the main path 11, supplies to the second judging circuit 146 a signal for controlling the sensitivity with which to switch the path to the sub path 12 by the path select/switch signal output from the first judging circuit 144. More specifically, for a luminance level where the moving image false contour is noticeable, the level detection circuit 145 outputs to the second judging circuit 146 a signal that increases the sensitivity with which to switch to the sub path 12; on the other hand, for a luminance level where the moving image false contour is inherently not easily detectable even when the image has a portion containing much motion, the level detection circuit 145 outputs a signal that reduces the sensitivity with which to switch to the sub path 12.

The reason that the level detection circuit 145 detects the luminance level by using the output image data from the main path 11 is that the luminance level where the moving image false contour is noticeable is substantially determined by the arrangement of the light emission subfield periods in the main path 11. In a portion rich in high-frequency components within an image, that is, in an edge portion, the difference between fields is detected even in an area where there is only a small amount of motion and, as a result, the amount of motion is detected more than necessary. In view of this, the edge detection circuit 142 detects an edge portion within the image based on the input image signal, and supplies the result to the first judging circuit 144. Then, the first judging circuit 144 normalizes the amount of motion, that is, the degree of motion, by dividing the difference by the edge component. As a result, the amount of motion in the edge portion is reduced, and the first judging circuit 144 generates and outputs the path select/switch signal so that the edge portion will not be processed through the main path 11.

Furthermore, as the moving image false contour becomes noticeable in a portion where gray scale changes smoothly or mildly, the false contour is not easily detectable in a portion rich in high-frequency components within an image. This characteristic is also an important factor to be considered when making a decision for the path switching; therefore, based on the input image signal, the edge detection circuit 142 outputs to the first judging circuit 144 a signal for controlling the sensitivity with which the path is switched to the sub path 12 by the path select/switch signal output from the second judging circuit 146. More specifically, the sensitivity with which to switch the path to the sub path 12 is controlled so that low-frequency regions where a gray scale changes smoothly can be easily processed through the sub path 12, in other words, edge portions can be easily processed through the main path 11.

The motion region detection circuit 143 detects a region containing motion within the image based on the smallest value of the difference from the image one field back and the difference from the image two fields back obtained from the luminance signal, and supplies the result of the detection to the first judging circuit 144. Further, the edge detection circuit 142 calculates a horizontal edge (horizontal line) and a vertical edge (vertical line) from the luminance signal, and obtains the amount of edge by mixing these edges. The amount of edge thus obtained is supplied to the first judging circuit 144. Therefore, based on the output information from the motion region detection circuit 143 and the edge detection circuit 142, the first judging circuit 144 judges pixels that tend to cause a moving image false contour, and supplies the result of the judgment to the second judging circuit 145.

The level detection circuit 145 detects the luminance level based on a corresponding one of the RGB signals that has been output from the main path 11. The luminance level detected by the level detection circuit 145 is supplied to the second judging circuit 146. Therefore, based on the result of the judgment from the first judging circuit 144 and the luminance level detected by the level detection circuit 145, the second judging circuit 146 generates the path select/switch signal for causing the path to be switched so that pixel data greater than a prescribed level will be processed through the sub path 12, and supplies the thus generated signal to the switch circuit 13. The level detection circuit 145 and the second judging circuit 146 together constitute a level judging section.

In this way, the path is automatically switched so that, normally, the input image signal is processed through the main path 11 which ensures an adequate number of gray scale levels, and so that the input image signal is processed through the sub path 12 only for pixel data that tends to cause a moving image false contour. Therefore, normally, the input image signal is processed through the main path 11 which provides an extremely good S/N ratio and ensures a sufficient number of real gray scale levels for the PDP, and the processed image is presented for display on the PDP 4; on the other hand, for an image portion where a moving image false contour is highly likely to occur, the image signal is processed through the sub path 12 which has a very high capability to eliminate the moving image false contour though the S/N ratio somewhat drops, and the processed image is presented for display on the PDP 4. In this case, as the light emission subfield periods in the main path 11 and the light emission subfield periods in the sub path 12 have a close relationship to each other, the path switching portion (boundary) is hardly noticeable.

FIG. 7 is a diagram for explaining one example of the level detection circuit in the image processing circuit of FIG. 3.

The level detection circuit 145 includes a memory such as a RAM or a ROM, as previously described, and outputs a level signal LV, for example, of level 0 to 3 (LV=0, 1, 2, 3) according to the image signal output from the main path 11 by referring to a conversion table such as shown in FIG. 7. Here, the level detection circuit 145 outputs the level "3" (LV=3) for gray scale levels where a moving image false contour distinctly occurs (gray scale levels where a moving image false contour is likely to occur distinctly), for example, for gray scale level 32 (only SF6 emits light), gray scale level 16 (only SF5 emits light), and gray scale level 8 (only SF4 emits light), where only a heavily weighted subfield emits light, and for gray scale level 48 (only SF6 and SF5 emit light) comparable to the above gray scale levels; on the other hand, the level detection circuit 145 outputs the level "2" (LV=2) for gray scale levels where a moving image false contour occurs relatively distinctly, that is, for gray scale levels that follow the gray scale levels for which LV=3 is output, and for gray scale levels comparable to them. The level detection circuit 145 outputs the level "1" (LV=1) for gray scale levels where a moving image false contour occurs weakly, that is, for gray scale levels that follow the gray scale levels for which LV=2 is output, and for gray scale levels comparable to them. That is, when there is a gray scale level for which LV=3 is output, LV=2 is output for the next gray scale level and LV=1 for the gray scale level after the next. For lower gray scale regions, the value of LV is determined empirically.

The level detection circuit 145 outputs the level "0" (LV=0) for gray scale levels where the moving image false contour does not occur. In FIG. 7, the rows with a circle attached to the left side are the gray scale levels used in the sub path 12. The level values shown in FIG. 7 are only examples, and are not limited to LV=0 to 3; further, the level values for the respective gray scale levels can be changed in various ways.

Figure 8:
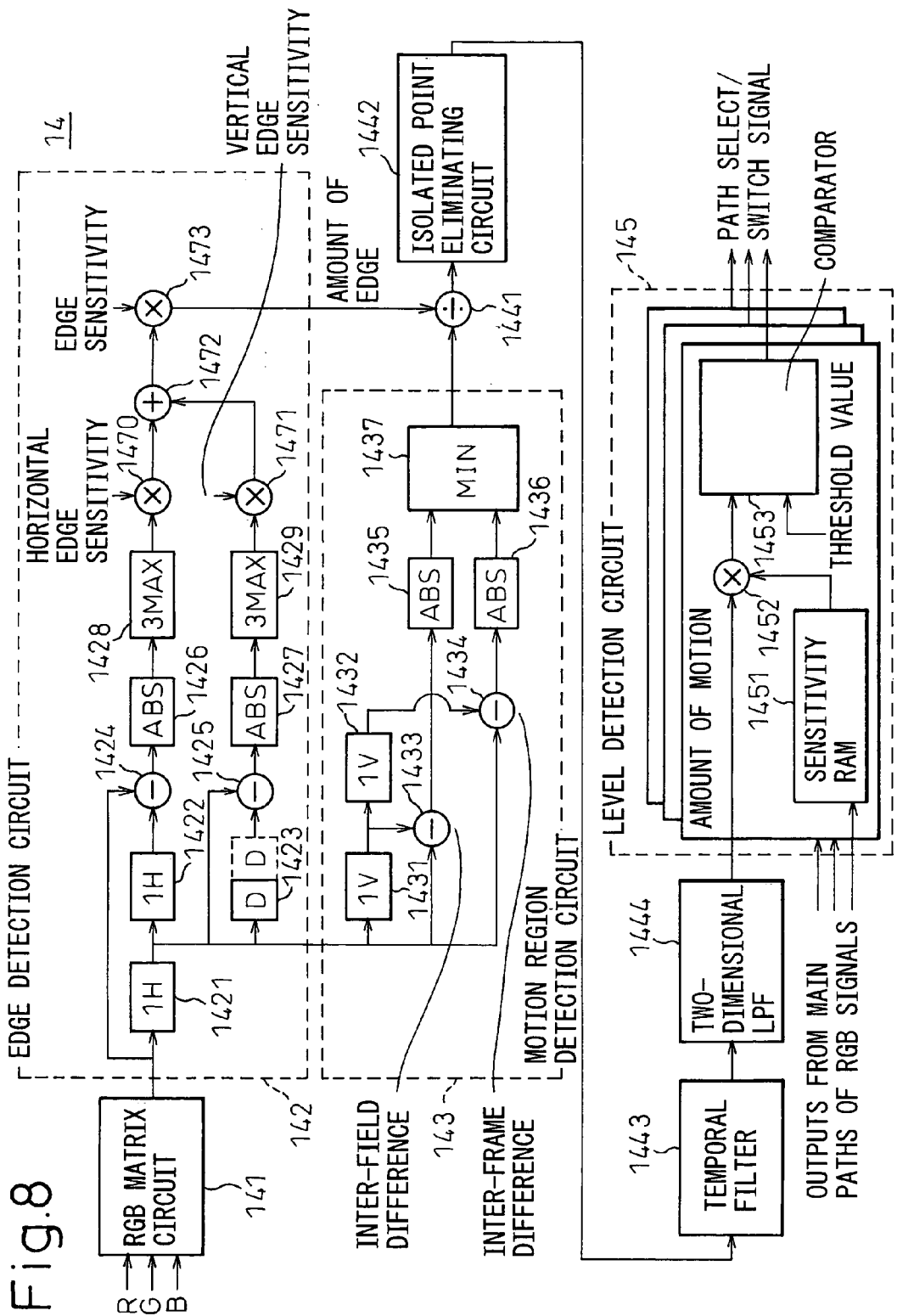
FIG. 8 is a block diagram showing one example of an image feature judging section in the image processing circuit of FIG. 3.

FIG. 8 is a block diagram showing one example of the image feature judging section in the image processing circuit of FIG. 3.

As shown in FIG. 8, the edge detection circuit 142 comprises 1H delay circuits 1421 and 1422, a delay circuit 1423, subtraction circuits 1424 and 1425, absolute value circuits 1426 and 1427, maximum value detection circuits 1428 and 1429, multiplication circuits 1470, 1471, and 1473, and an addition circuit 1472. The motion region detection circuit 143 comprises 1V delay circuits 1431 and 1432, subtraction circuits 1433 and 1434, absolute value circuits 1435 and 1436, and a minimum value detection circuit 1437. Here, 1 H indicates one horizontal scan period of the input image signal, and 1V indicates one vertical scan period of the input image signal.

The first judging circuit 144 comprises a division circuit 1441, on the output side of which are connected an isolated point eliminating circuit 1442, a temporal filter 1443, and a two-dimensional low-pass filter (LPF) 1444. The level detection circuit 145 comprises a sensitivity RAM 1451, a multiplication circuit 1452, and a comparator 1453.

In the edge detection circuit 142, the subtraction circuit 1424 obtains the difference between the current input luminance signal Y and the input luminance signal Y two H's back, and the absolute value circuit 1426 obtains the absolute value of the difference fed from the subtraction circuit 1424. Of the absolute values obtained by the absolute value circuit 1426, the maximum value detection circuit 1428 detects, for example, the three largest absolute values and outputs them to the multiplication circuit 1470. The multiplication circuit 1470 is supplied with a coefficient that determines the sensitivity with which to detect a horizontal edge extending in a horizontal direction, and the output of the multiplication circuit 1470 is supplied to the addition circuit 1472.

The delay circuit 1423 delays the input luminance signal Y on a pixel-by-pixel basis (D), and the subtraction circuit 1425 obtains the difference between pixels of the input image signal. The absolute value circuit 1427 obtains the absolute value of the difference fed from the subtraction circuit 1425 and, of the absolute values obtained by the absolute value circuit 1427, the maximum value detection circuit 1429 detects, for example, the three largest absolute values and outputs them to the multiplication circuit 1471. The multiplication circuit 1471 is supplied with a coefficient that determines the sensitivity with which to detect a vertical edge extending in a vertical direction, and the output of the multiplication circuit 1471 is supplied to the addition circuit 1472. The output of the addition circuit 1472 is supplied to the multiplication circuit 1473 where it is multiplied with a coefficient that determines the edge sensitivity as a whole. The multiplication circuit 1473 thus outputs a signal, indicating the amount of edge, which is supplied to the division circuit 1441.

In the motion region detection circuit 143, the subtraction circuit 1433 obtains the difference of the input luminance signal Y between two adjacent field periods and supplies it to the absolute value circuit 1435, while the subtraction circuit 1434 obtains the difference of the input luminance signal Y between two adjacent frame periods and supplies it to the absolute value circuit 1436. Therefore, the absolute value circuit 1435 obtains the absolute value of the difference between the input luminance signal Y in the current field period and the input luminance signal Y one field period back, and supplies it to the minimum value detection circuit 1437.

The absolute value circuit 1436 obtains the absolute value of the difference between the input luminance signal Y in the current field period and the input luminance signal Y two field periods back, and supplies it to the minimum value detection circuit 1437 which, of the absolute values supplied from the absolute value circuits 1435 and 1436, supplies the smallest value to the division circuit 1441 as a signal indicating the amount of motion. When non-interlaced scanning is employed, a difference may be detected between an odd-numbered field period and the even-numbered field period that follows, even when actually there is no motion in the image. Therefore, the difference is obtained between the input luminance signal Y in the current field period and the input luminance signal Y two field periods back as well as the difference between the input luminance signal Y in the current field period and the input luminance signal Y one field period back, and the amount of motion is obtained from the smallest of their absolute values.

The absolute value of the difference obtained from each of the absolute value circuits 1435 and 1436 is, for example, in units of levels/field, and the amount of motion obtained from the minimum value detection circuit 1437 is, for example, in units of dots/field. Here, the amount of motion is expressed as Amount of Motion (dots/field)={(|difference(minimum value) (levels/field)|)}÷{|slope(levels/dot)|}.

The division circuit 1441 normalizes the degree of motion in the image, i.e., the amount of motion, by dividing the amount of motion obtained from the minimum value detection circuit 1437 by the amount of edge obtained from the multiplication circuit 1473. The amount of motion normalized by the division circuit 1441 is supplied to the multiplication circuit 1452 in the level detection circuit 145 via the isolated point eliminating circuit 1442, the temporal filter 1443, and the two-dimensional LPF 1444.

The isolated point eliminating circuit 1442 is provided to eliminate isolated image data such as noise. For example, if, in a given region within the image, only one pixel is in motion while its surrounding pixels do not exhibit any motion, that one pixel can be regarded as noise, and in such cases, the isolated point is eliminated by the isolated point eliminating circuit 1442. More specifically, the amount of motion of each pixel in each line is compared with a threshold value, and any pixel whose amount of motion is smaller than the threshold value can be eliminated as an isolated point by regarding it as a non-moving pixel.

The temporal filter 1443 is provided to correct the falling of the level of motion-exhibiting pixel data so that the level falls slowly along the time axis. For example, when a particular pixel within the image, which is in motion, stops abruptly, its motion does not appear to stop immediately, to the human eye, because of the persistence of human vision, etc. even though that particular pixel has stopped when seen in terms of the image data. Therefore, the temporal filter 1443 corrects the falling of the level of the motion-exhibiting pixel data so that the level falls slowly along the time axis, thereby making the image displayed on the PDP 4 match the characteristics of human vision, thus reducing the unnaturalness of the image. In a specific method, the temporal filter 1443 obtains the maximum value from the amount of motion obtained from the isolated point eliminating circuit 1442 and the value read out of the memory described later, multiplies the maximum value with a coefficient smaller than 1, and stores the result in the memory. The obtained maximum value is output from the temporal filter 1443 and fed to the two-dimensional LPF 1444. That is, as the amount of motion stored in the memory decreases little by little, the amount of motion being output from the temporal filter 1443 decreases mildly even when the actual amount of motion has dropped to zero.

The two-dimensional LPF 1444 corrects data of one pixel based on the data of its surrounding pixels, and thereby averages the pixel data within a certain range to prevent only one pixel from showing a level extremely different from the levels of its surrounding pixels. That is, the two-dimensional LPF 1444 corrects the amount of motion in two-dimensional space. The two-dimensional LPF 1444 having such a function is well known in the art.

The level detection circuit 145 comprises three detection circuit sections one for each of the RGB signals, each section comprising the sensitivity RAM 1451, multiplication circuit 1452, and comparator 1453. For example, the output of the main path 11 for the R signal is supplied to the sensitivity RAM 1451 in the detection circuit section for the R signal, and the amount of motion supplied from the two-dimensional LPF 1444 is multiplied in the multiplication circuit 1452 by the coefficient read out of the sensitivity RAM 1451. The amount of motion thus multiplied is supplied to the comparator 1453. The comparator 1453 compares the amount of motion supplied from the multiplication circuit 1452 with a threshold value; if the amount of motion supplied from the multiplication circuit 1452 is larger than the threshold value, the comparator 1453 outputs a path select/switch signal for switching the R signal path to the sub path 12. In a like manner, the detection circuit sections for the G and B signals each output a path select/switch signal for switching the G or B signal path based on the output of the main path 11 for the G or B signal, respectively.

Therefore, in each of the RGB processing systems, normally the input image signal (corresponding one of the RGB signals) is processed through the main path that ensures a relatively large number of gray scale levels, but pixel data that tends to cause a moving image false contour is processed through the sub path 12 by automatically switching the path to the sub path 12. In principle, the S/N ratio of the image displayed based on the image data processed through the sub path 12 is somewhat inferior to that of the image displayed based on the image data processed through the main path 11 but, as the image displayed based on the image data processed through the sub path 12 represents a moving image portion, the degradation of the S/N ratio is hardly noticeable to the human eye and, therefore, does not present any problem in practice. In this case, the calculation parameters used in the main path 11 and the sub path 12 are set so that the degradation of the S/N ratio caused by processing the data through the sub path 12 will not become noticeable to the human eye. Here, as a matter of course, the calculation parameters used in the main path 11 and the sub path 12 need to be re-set to optimum parameters each time the driving sequence for the PDP 4 or the subfield structure for the PDP 4 is changed.

In the prior art, various display driving techniques for reducing the moving image false contour have been proposed as described above. Specifically, for example, in the image processing circuit in the prior art plasma display apparatus shown in FIG. 3 (for example, JPP'455), the path for processing a region where a moving image false contour due to motion is highly likely to occur can be switched to the sub path by adjusting the main-path/sub-path determination level, but in actual operation, there have occurred cases where the processing of a region where the moving image false contour is not likely to occur is also switched to the sub path. One of the possible causes is that noise is contained in the input image signal itself and is detected as a moving image false contour even for regions where the motion region detection circuit tends to make erroneous detections. In such cases, the image region processed through the sub path contains noise due to error diffusion, that is, the image region appears like noise due to the reduced number of gray scale levels, resulting in a degradation of picture quality.

Further, in the color detection circuit described in JPP'101, the path is switched to the sub path only when a motion region is detected from the RGB signals in a color space region where the moving image false contour is noticeable due to the characteristics of human vision; however, not only for flesh-tone colors in the color space region, but for other colors close to it, for example, colors of desert sand or colors of soils or walls, the path has also been switched to the sub path, and this has degraded the picture quality.

An object of the present invention to provide a display apparatus and a display driving method that can effectively eliminate the occurrence of a moving image false contour without incurring a substantial increase in cost.

A plasma display apparatus according to the present invention is characterized by the inclusion of a motion detection correction circuit, wherein when a pixel where a moving image false contour is not easily perceivable or is not likely to occur is detected based on an output signal (level signal) of a level detection circuit (level signal LV=0), the motion detection correction circuit outputs a signal MV'=0 regardless of an output of a first judging circuit. On the other hand, when a pixel where a moving image false contour is easily perceivable or is likely to occur is detected by the level detection circuit (level signal LV=1, 2, or 3), the motion detection correction circuit produces the same output as the output of the first judging circuit (MV'=MV).

A second judging circuit makes a judgment based on the output result of the motion detection correction circuit and the output of the level detection circuit, generates a switching control signal for switching to a main path or a sub path, and supplies it to a selector switch.

In this way, with the provision of the motion detection correction circuit which is implemented in a circuit configuration simpler than a color detection circuit, the plasma display apparatus according to the present invention can switch the path to the sub path only when a gray scale level where a moving image false contour is likely to occur is detected, and this serves to enhance the picture quality.

Below, embodiments of a display apparatus and a display driving method according to the present invention will be described in detail with reference to the drawings.

Figure 9:
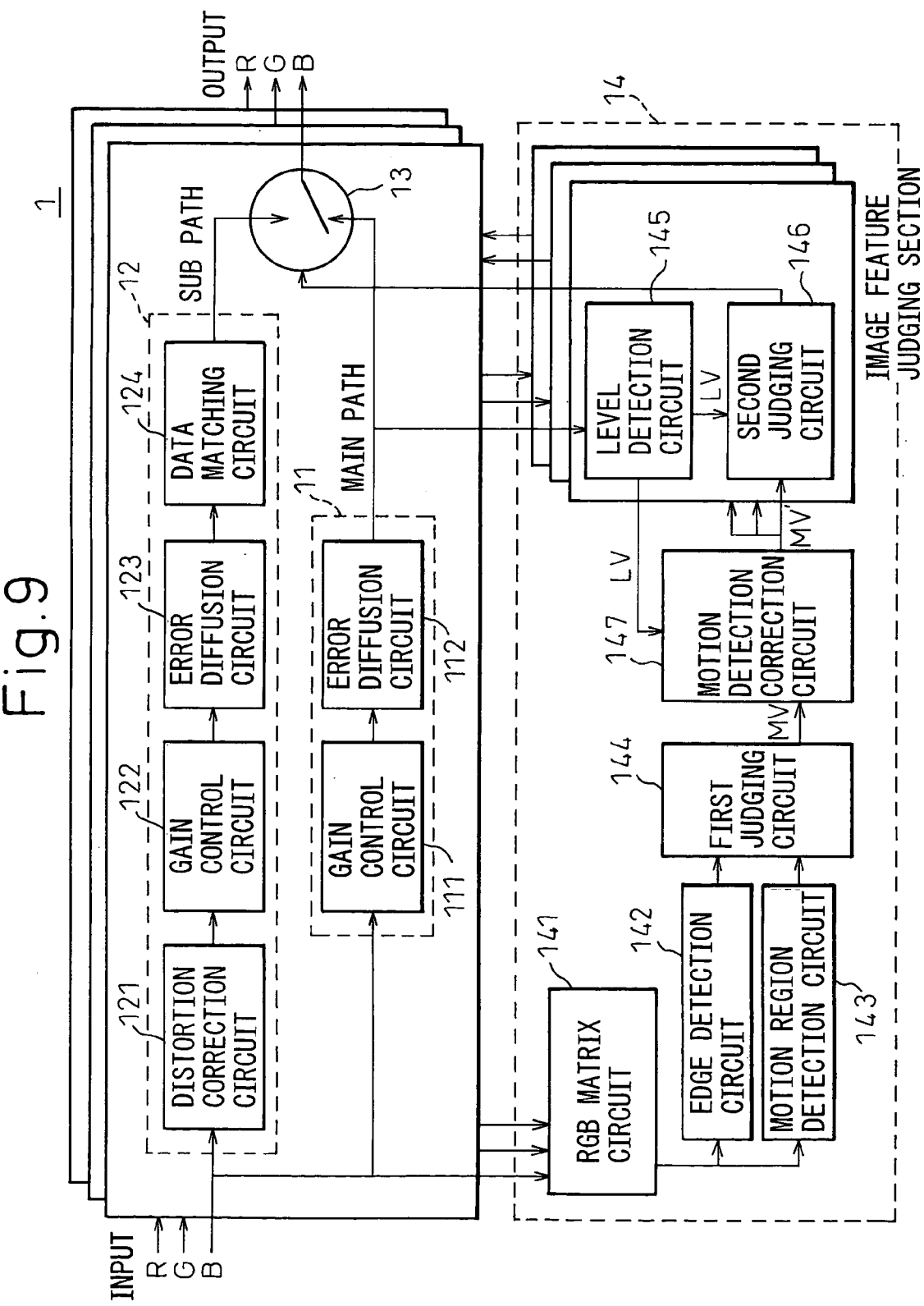
FIG. 9 is a block diagram showing one embodiment of an image processing circuit in a plasma display apparatus according to the present invention.

FIG. 9 is a block diagram showing one embodiment of an image processing circuit in the plasma display apparatus according to the present invention, which is applied, for example, as the image processing circuit 1 in the plasma display apparatus previously shown in FIG. 1. In FIG. 9, reference numeral 1 is the image processing circuit, 11 is a main path, 12 is a sub path, 13 is a switch circuit, and 14 is an image feature judging section. Further, reference numeral 111 is a gain control circuit, 112 is an error diffusion circuit, 121 is a distortion correction circuit, 122 is a gain control circuit, 123 is an error diffusion circuit, and 124 is a data matching circuit. On the other hand, reference numeral 141 is an RGB matrix circuit, 142 is an edge detection circuit, 143 is a motion region detection circuit, 144 is a first judging circuit, 145 is a level detection circuit, 146 is a second judging circuit, and 147 is a motion detection correction circuit.

As is apparent from a comparison between FIG. 9 and the previously shown FIG. 3, the image processing circuit in the plasma display apparatus according to the embodiment shown in FIG. 9 differs from the image processing circuit 1 shown in FIG. 3 by the inclusion of the motion detection correction circuit 147 which is inserted between the first judging circuit 144 and the second judging circuit 146 in the image feature judging section 14. In the image processing circuit of the plasma display apparatus shown in FIG. 9, the main path 11, the sub path 12, the switch circuit 13, and the image feature judging section 14, excluding the motion detection correction circuit 147, are essentially the same in configuration as those previously shown in FIG. 3, and the description thereof will not be repeated here. Further, the RGB matrix circuit 141, the edge detection circuit 142, the motion region detection circuit 143, the first judging circuit 144, the level detection circuit 145, and the second judging circuit 146 in the image feature judging section 14 shown in FIG. 9 are the same in configuration as those described with reference to FIGS. 3 to 8, and the description thereof will also be omitted here. It will be noted here that, except in the embodiment to be described later with reference to FIG. 15, the level detection circuit 145 includes a conversion table constructed from a RAM or a ROM such as previously described with reference to FIG. 7.

In the present embodiment, the level detection circuit 145 includes a memory such as a RAM or a ROM, and outputs a level signal LV, for example, of level 0 to 3 (LV=0, 1, 2, 3) according to the image signal output from the main path 11 by referring to the conversion table such as shown in FIG. 7. The level detection circuit 145 outputs LV=3 for gray scale levels where a moving image false contour distinctly occurs (gray scale levels where a moving image false contour is likely to occur distinctly), LV=2 for gray scale levels where a moving image false contour occurs relatively distinctly, LV=1 for gray scale levels where a moving image false contour occurs weakly, and LV=0 for gray scale levels where the moving image false contour does not occur.

Figure 10:
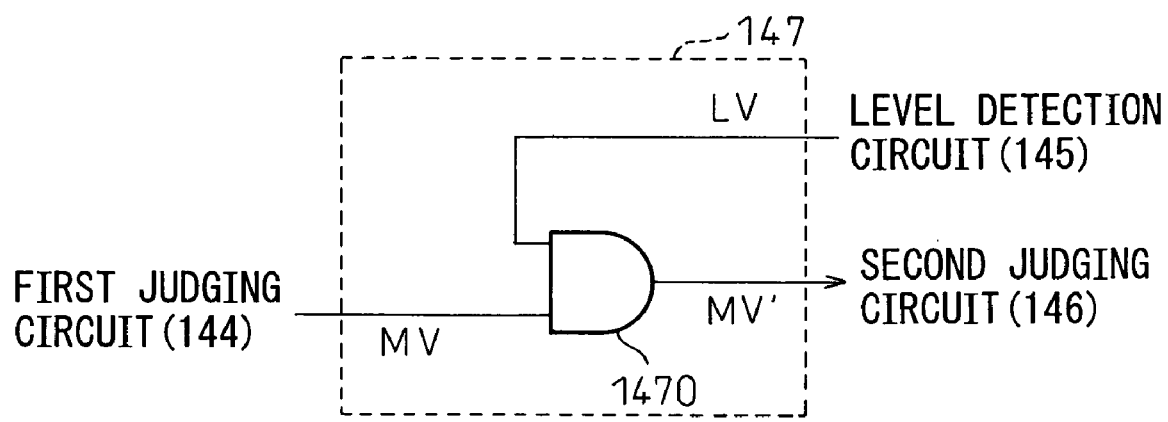
FIG. 10 is a block diagram conceptually showing one example of a motion detection correction circuit in the image processing circuit of FIG. 9.

FIG. 10 is a block diagram conceptually showing one example of the motion detection correction circuit in the image processing circuit of FIG. 9.

As shown in FIG. 10, the motion detection correction circuit 147 is conceptually constructed as an AND circuit 1470, which takes as inputs the level signal LV from the level detection circuit 145, which indicates the degree of tendency for a moving image false contour to occur, and a signal MV from the first judging circuit 144, which indicates the amount of motion, and ANDs the signals LV and MV to produce an output signal MV' which is supplied to the second judging circuit 146.

That is, when the level signal LV is "0", the output signal MV' of the motion detection correction circuit 147 is always "0" (LV=0→MV'=0), while when the signal LV is other than "0" (that is, when it is "3", "2", or "1"), MV is output directly as MV' (LV≠0→MV'=MV).

As a result, even for regions where the motion region detection circuit 143 tends to make erroneous detections, for example, if the level signal LV from the level detection circuit 145 is "0", the main path 11 is always selected, and degradation of the picture quality can thus be prevented. Furthermore, since the motion detection correction circuit 147 can be constructed with simple circuitry, the occurrence of a moving image false contour can be effectively eliminated without incurring a substantial increase in cost.

Figure 11:
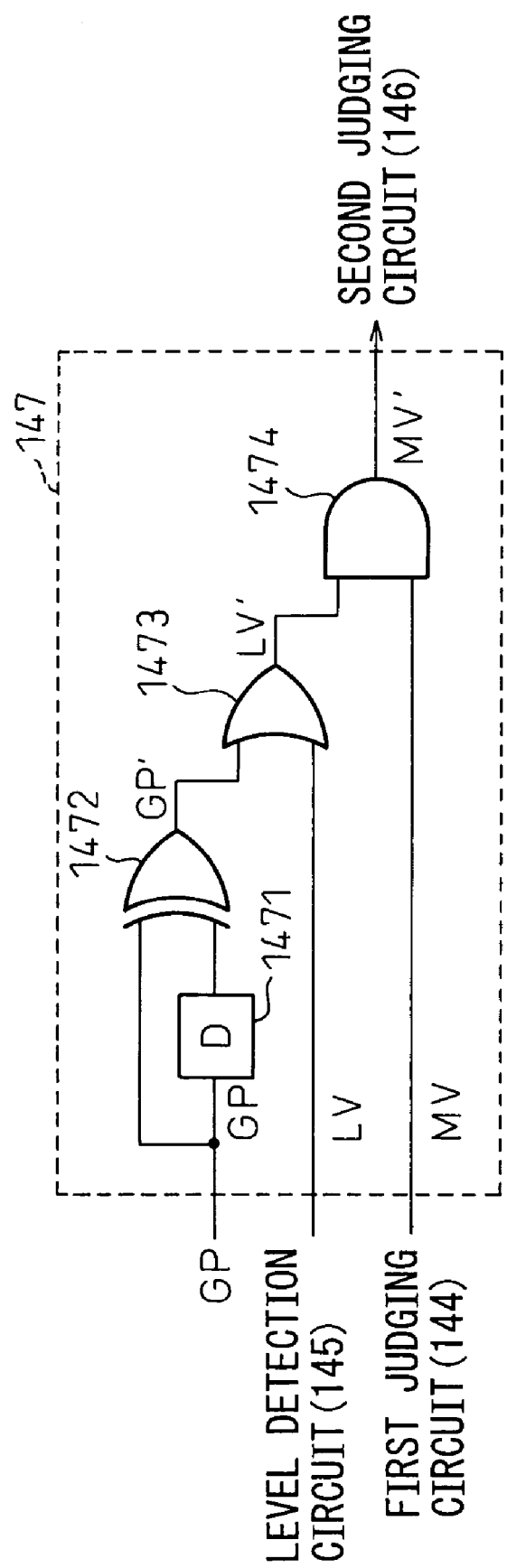
FIG. 11 is a block diagram conceptually showing another example of the motion detection correction circuit in the image processing circuit of FIG. 9.

FIG. 11 is a block diagram conceptually showing another example of the motion detection correction circuit in the image processing circuit of FIG. 9, and FIG. 12 is a diagram for explaining the operation of the motion detection correction circuit of FIG. 11.

In the motion detection correction circuit shown in FIG. 10, if the gradation is large (the difference in gray scale between adjacent pixels is large), the occurrence of a moving image false contour cannot be effectively prevented. Specifically, in FIG. 12, for example, consider the case where pixels GS, one with gray scale level 2 and the other with gray scale level 8, are displayed one adjacent to the other; as can be seen, there exists between these gray scale levels a gray scale level where a moving image false contour tends to occur (gray scale level 6 for which LV=3 indicating that a moving image false contour distinctly occurs). In this case, the motion detection correction circuit shown in FIG. 10 invariably selects the main path 11.

In contrast, in the motion detection correction circuit shown in FIG. 11, the section from the first occurrence of the level signal LV "0" to the next occurrence of the level signal LV "0" is taken as one group GP in order to detect the moving image false contour existing between the gray scale level 2 and the gray scale level 8. Then, when compared with the GP of a pixel adjacent in the horizontal direction, if the GP is the same, "0" is output as GP', but if the GP is different, "1" is output as GP'.

More specifically, as shown in FIG. 11, the motion detection correction circuit 147 conceptually comprises a delay circuit (a latch or flip-flop for introducing a delay of time D corresponding to one pixel) 1471, an EOR circuit 1472, an OR circuit 1473, and an AND circuit 1474; here, the signal MV from the first judging circuit 144, which indicates the amount of motion, is supplied to one input of the AND circuit 1474, and the output LV' of the OR circuit 1473 is supplied to the other input of the AND circuit 1474. The output signal LV of the level detection circuit 145 is supplied to one input of the OR circuit 1473, and the output signal GP' of the EOR circuit 1472 is supplied to the other input of the OR circuit 1473. The signal GP is supplied to one input of the EOR circuit 1472, and the signal GP delayed through the delay circuit 1471 is supplied to the other input of the EOR circuit 1472.

According to the motion detection correction circuit 147 shown in FIG. 11, when GP' is "0", that is, when the GP is the same, the output LV' of the OR circuit 1473 at the next stage becomes the same as the output signal LV of the level detection circuit 145. As a result, the circuit (AND circuit 1474) that follows the OR circuit 1473 operates in the same manner as in the circuit configuration shown in FIG. 10. On the other hand, when the GP is different, GP' is "1", and the output LV' of the OR circuit 1473 at the next stage is therefore "1"; as a result, the output signal MV of the first judging circuit 144 is output unchanged as the output signal MV' of the motion detection correction circuit 147.

Therefore, in FIG. 12, for example, when a pixel with gray scale level 2 and a pixel with gray scale level 8 are adjacent to each other, since GP' is "1", the output signal (motion signal) MV of the first judging circuit 144 is supplied to the second judging circuit 146. This serves to prevent the occurrence of a moving image false contour in a gently sloping gray scale display, and as a result, the picture quality can be further enhanced.

Figure 13:
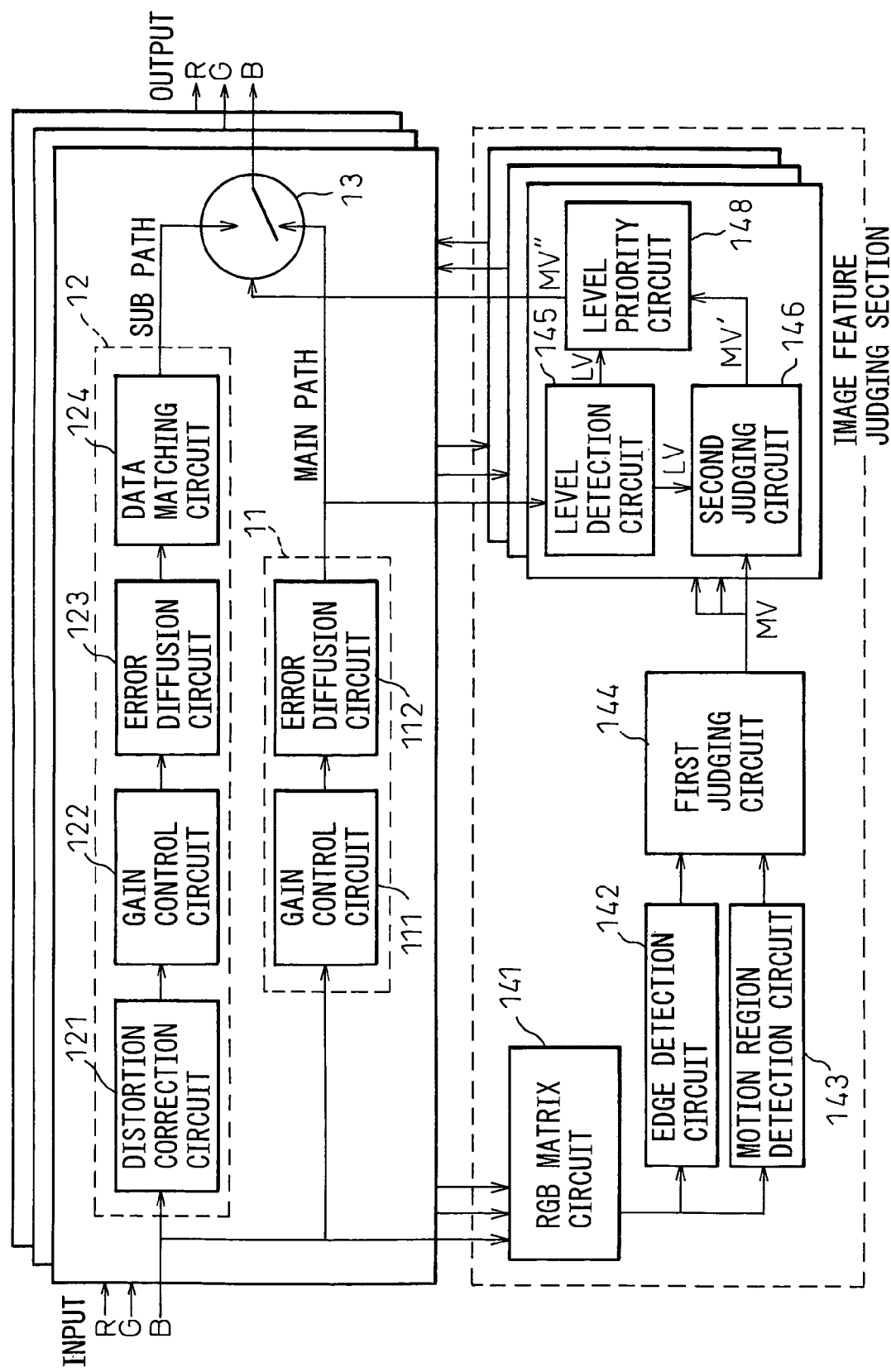
FIG. 13 is a block diagram showing another embodiment of an image processing circuit in the plasma display apparatus according to the present invention.

FIG. 13 is a block diagram showing another embodiment of an image processing circuit in the plasma display apparatus according to the present invention.

As is apparent from a comparison between FIG. 13 and FIG. 9, in this embodiment, the motion detection correction circuit 147 shown in FIG. 9 is omitted and, instead, a level priority circuit 148 is provided that controls the switch circuit 13 by receiving the output of the level detection circuit 145 and the output of the second judging circuit 146.

Figure 14:
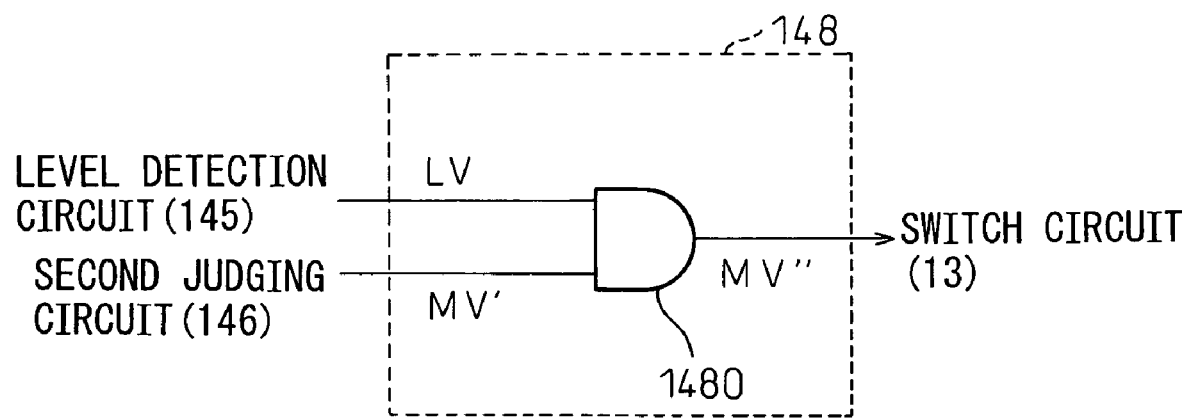
FIG. 14 is a block diagram conceptually showing one example of a level priority circuit in the image processing circuit of FIG. 13.

FIG. 14 is a block diagram conceptually showing one example of the level priority circuit in the image processing circuit of FIG. 13.

As shown in FIG. 14, the level priority circuit 148 is conceptually constructed as an AND circuit 1480, which takes as inputs the level signal LV from the level detection circuit 145, which indicates the degree of tendency for a moving image false contour to occur, and the signal MV' from the second judging circuit 146, which indicates the amount of motion, and ANDs the signals LV and MV' to produce an output signal (a switching control signal) MV" which is supplied to the switch circuit 13. Based on this control signal MV", the switch circuit 13 selects the output of the main path 11 or the output of the sub path 12.

That is, when the signal LV is "0", the output signal MV" of the level priority circuit 148 is always "0" (LV=0→MV"=0), while, when the signal LV is other than "0", MV" is the same as MV' (LV≠0→MV"=MV'), that is, the amount of motion MV' is output directly from the level priority circuit 148.

FIG. 15 is a block diagram schematically showing a level detection circuit in still another embodiment of an image processing circuit in the plasma display apparatus according to the present invention.

As previously noted, in this embodiment, the level detection circuit 145 does not include a conversion table constructed from a RAM or a ROM, but comprises computation circuits as shown in FIG. 15. The configuration of the other circuit blocks, i.e., the main path 11, the sub path 12, the switch circuit 13, and the image feature judging section 14, excluding the level detection circuit 145, is substantially the same as that previously shown in FIG. 3.

As shown in FIG. 15, the level detection circuit 145 in this embodiment comprises a delay circuit (a latch or flip-flop for introducing a delay of time D corresponding to one pixel) 510, first gray scale comparing circuits 511, 521, and 531 each for comparing the image signal i1 from the main path 11 with a prescribed gray scale level (a gray scale level such as 32 or 16 where a moving image false contour distinctly occurs), second gray scale comparing circuits 512, 522, and 532 each for comparing the one-pixel-delayed image signal i2 from the main path 11 with the prescribed gray scale level, EOR circuits 541, 542, and 543, multiplication circuits 551, 552, and 553 each for multiplying the multiplicand with a prescribed coefficient, and an addition circuit 560 which adds together output signals of the multiplication circuits 551, 552, and 553 and outputs a level signal LV.

More specifically, the first gray scale comparing circuit 511 whose output is supplied to the EOR circuit 541 compares the image signal i1, for example, with the gray scale level 16, and the second gray scale comparing circuit 512 compares the image signal i2 with the gray scale level 16; if the outputs of the first and second gray scale comparing circuits 511 and 512 do not match, that is, if the current gray scale level has changed from the gray scale level one pixel back by crossing the gray scale level 16 where a distinct moving image false contour occurs, a logic "1" signal is output which is then multiplied, for example, with a weight "3" in the multiplication circuit 551, and the level signal LV=3 is output from the addition circuit 560. In this case, the switch circuit 13 selects the output of the sub path 12 which is the path used when a moving image false contour occurs.

On the other hand, if the outputs of the first and second gray scale comparing circuits 511 and 512 match, the output of the EOR circuit 541 is a logic "0", and the output via the multiplication circuit 551 is also "0". Then, if the outputs of all of the other EOR circuits 552, 553, etc. are also "0", the addition circuit 560 outputs the level signal LV=0, and the switch circuit 13 selects the output of the main path 11 by determining that a moving image false contour does not occur.

Further, the first gray scale comparing circuit 521 whose output is supplied to the EOR circuit 542 compares the image signal i1, for example, with the gray scale level 8, and the second gray scale comparing circuit 522 compares the image signal i2 with the gray scale level 8; if the outputs of the first and second gray scale comparing circuits 521 and 522 do not match, that is, if the current gray scale level has changed from the gray scale level one pixel back by crossing the gray scale level 8, a logic "1" signal is output which is then multiplied, for example, with a weight "3" in the multiplication circuit 552, and the level signal LV=3 is output from the addition circuit 560. On the other hand, if the outputs of the first and second gray scale comparing circuits 521 and 522 match, the output of the EOR circuit 542 is a logic "0"; here, if the outputs of all of the other EOR circuits 551, 553, etc. are also "0", the level signal LV=0 is output from the addition circuit 560.

In the level detection circuit described above, gray scale levels for which the level LV previously shown in FIG. 7 is 3 or 2 (or 1) are set in the respective first and second gray scale comparing circuits 511 and 512, 521 and 522, 531 and 532, etc. whose outputs are supplied to the respective EOR circuits 541, 542, 543, etc. and, to correspond with the thus set gray scale levels, the coefficients 3 or 2 (or 1) are set in the respective multiplication circuits 551, 552, 553, etc.

In this way, according to the present embodiment, the conversion table that requires a large RAM or ROM can be omitted from the level detection circuit 145, and the occurrence of a moving image false contour can be effectively eliminated without incurring a substantial increase in cost.

The present invention is not limited in application to plasma display apparatuses, but is applicable to any display apparatus that expresses luminance by varying light emission time length and achieves gray scale display by using a subfield method, and that has a main path and a sub path in order to reduce the moving image false contour.

As described above, according to the present invention, a display apparatus and a display driving method that can effectively eliminate the occurrence of a moving image false contour can be provided without incurring a substantial increase in cost.

Many different embodiments of the present invention may be constructed without departing from the spirit and scope of the present invention, and it should be understood that the present invention is not limited to the specific embodiments described in this specification, except as defined in the appended claims.

What is claimed is:

1. A display apparatus which expresses luminance by varying light emission time length and displays a gray scale by using a subfield method, comprising:
 a main path generating a first image signal having a smaller number of gray scale levels than an input image signal;
 a sub path generating a second image signal having a smaller number of gray scale levels than said first image signal;

a switch circuit outputting said first image signal generated by said main path or said second image signal generated by said sub path by switching therebetween;

a motion region detection circuit detecting a motion region from said input image signal or a signal obtained by processing said input image signal;

a first judging circuit outputting a first motion signal in accordance with an output of said motion region detection circuit;

a level detection circuit outputting a level signal by detecting a pixel of a particular gray scale level from said main path;

a motion detection correction circuit receiving said first motion signal and said level signal, and outputting a second motion signal in accordance with said level signal; and a second judging circuit receiving said second motion signal and said level signal, and outputting a switching control signal to said switch circuit.

2. The display apparatus as claimed in claim 1, wherein when said level signal from said level detection circuit indicates a gray scale level where a moving image false contour occurs, said motion detection correction circuit outputs said first motion signal from said first judging circuit through to said second judging circuit.

3. The display apparatus as claimed in claim 2, wherein said level detection circuit outputs a signal of level 0 for a gray scale level where a moving image false contour does not occur, and a signal of another level for a gray scale level where a moving image false contour occurs.

4. The display apparatus as claimed in claim 3, wherein for a gray scale level where a moving image false contour occurs, said level detection circuit outputs a signal of one of levels 1 to 3 depending on the magnitude of said moving image false contour that occurs.

5. The display apparatus as claimed in claim 1, further comprising an edge detection circuit detecting an edge from said input image signal or a signal obtained by processing said input image signal, wherein said first judging circuit receives an output signal of said edge detection circuit as well as an output signal of said motion region detection circuit, and outputs said motion signal.

6. The display apparatus as claimed in claim 1, wherein said image signal is any one of RGB signals of red, green, and blue; and said main path, said sub path, said switch circuit, said motion region detection circuit, said first judging circuit, said level detection circuit, said motion detection correction circuit, and said second judging circuit are provided for each of said RGB signals.

7. The display apparatus as claimed in claim 1, wherein said display apparatus is a plasma display apparatus.

8. A display driving method for driving a display that expresses luminance by varying light emission time length and displays gray scale by using a subfield method, said display comprising:

a main path generating a first image signal having a smaller number of gray scale levels than an input image signal;

a sub path generating a second image signal having a smaller number of gray scale levels than said first image signal;

a switch circuit outputting said first image signal generated by said main path or said second image signal generated by said sub path by switching therebetween; and an image feature judging section controlling said switch circuit by detecting an image feature from said input image signal or a signal obtained by processing said input image signal, and by also detecting a pixel of a particular gray scale level from said main path, wherein said image feature judging section detects a motion region from said input image signal or said processed signal;

generates a first motion signal based on said detected motion region;

generates a level signal by detecting the pixel of said particular gray scale level from said main path;

generates a second motion signal by correcting said first motion signal in accordance with said level signal; and generates, in accordance with said second motion signal and said level signal, a switching control signal for controlling said switch circuit.

9. The display driving method as claimed in claim 8, wherein when said level signal indicates a gray scale level where a moving image false contour occurs, said second motion signal is substantially the same signal as said first motion signal.

10. The display driving method as claimed in claim 9, wherein said level signal is a signal of level 0 for a gray scale level where a moving image false contour does not occur, and is a signal of another level for a gray scale level where a moving image false contour occurs.

11. The display driving method as claimed in claim 10, wherein for a gray scale level where a moving image false contour occurs, said level signal is a signal of one of levels 1 to 3 depending on the magnitude of said moving image false contour that occurs.

12. The display driving method as claimed in claim 8, wherein said first motion signal is generated based on said motion region detected from said input image signal or said processed signal and on an edge detected from said input image signal or a signal obtained by processing said input image signal.

13. The display driving method as claimed in claim 8, wherein said image signal is any one of RGB signals of red, green, and blue; and said main path, said sub path, said switch circuit, and said image feature judging section are provided for each of said RGB signals.

14. The display driving method as claimed in claim 8, wherein said display panel is a plasma display panel.

* * * * *